US009309407B2

(12) United States Patent
Rosenquist

(10) Patent No.: US 9,309,407 B2
(45) Date of Patent: Apr. 12, 2016

(54) POLYCARBONATE-SILOXANE COPOLYMER FLAME RETARDED WITH A SILICONE BASED CORE SHELL MODIFIER

(71) Applicant: SABIC Innovative Plastics IP B.V., Bergen op Zoom (NL)

(72) Inventor: Niles Richard Rosenquist, Evansville, IN (US)

(73) Assignee: SABIC GLOBAL TECHNOLOGIES B.V., Bergen Op Zoom (NL)

(*) Notice: Subject to any disclaimer, the term of this patent is extended or adjusted under 35 U.S.C. 154(b) by 0 days.

(21) Appl. No.: 14/261,133

(22) Filed: Apr. 24, 2014

(65) Prior Publication Data

US 2014/0329920 A1 Nov. 6, 2014

Related U.S. Application Data

(60) Provisional application No. 61/818,607, filed on May 2, 2013.

(51) Int. Cl.
| | |
|---|---|
| *C08L 69/00* | (2006.01) |
| *C08L 83/06* | (2006.01) |
| *C08L 27/18* | (2006.01) |
| *C08L 83/10* | (2006.01) |
| *C08G 77/448* | (2006.01) |
| *C08G 77/442* | (2006.01) |

(52) U.S. Cl.
CPC ............ *C08L 83/06* (2013.01); *C08L 27/18* (2013.01); *C08L 69/00* (2013.01); *C08L 83/10* (2013.01); *C08G 77/442* (2013.01); *C08G 77/448* (2013.01); *C08L 2201/02* (2013.01); *C08L 2207/53* (2013.01)

(58) Field of Classification Search
None
See application file for complete search history.

(56) References Cited

U.S. PATENT DOCUMENTS

| | | | |
|---|---|---|---|
| 3,516,968 A | 6/1970 | Moore et al. | |
| 6,072,011 A | 6/2000 | Hoover | |
| 6,723,864 B2 | 4/2004 | Silva et al. | |
| 6,800,685 B1* | 10/2004 | Yoshihara et al. | 524/451 |
| 6,833,422 B2 | 12/2004 | Silva et al. | |
| 6,838,501 B2* | 1/2005 | Takesue et al. | 524/394 |
| 6,870,013 B2 | 3/2005 | Silva et al. | |
| 7,112,644 B2 | 9/2006 | Morishita et al. | |
| 7,166,687 B2 | 1/2007 | Venderbosch et al. | |
| 7,244,804 B2 | 7/2007 | Ikeda et al. | |
| 7,615,594 B2 | 11/2009 | Hashimoto et al. | |
| 7,671,143 B2 | 3/2010 | Lee et al. | |
| 2003/0060548 A1* | 3/2003 | Goossens et al. | 524/394 |
| 2007/0149722 A1 | 6/2007 | Fujiguchi et al. | |
| 2007/0276069 A1* | 11/2007 | Agarwal et al. | 524/394 |
| 2008/0004397 A1 | 1/2008 | An et al. | |
| 2009/0186207 A1 | 7/2009 | Hayata et al. | |
| 2010/0157217 A1 | 6/2010 | Kim et al. | |
| 2011/0054107 A1 | 3/2011 | Hayata et al. | |
| 2012/0248102 A1* | 10/2012 | van de Wetering et al. | 220/3.2 |
| 2012/0296020 A1 | 11/2012 | Parakkal et al. | |
| 2013/0274417 A1 | 10/2013 | Muthulakshmi et al. | |

FOREIGN PATENT DOCUMENTS

| | | | |
|---|---|---|---|
| WO | 2012058821 A1 | 5/2012 | |
| WO | 2014179375 A1 | 11/2014 | |

OTHER PUBLICATIONS

Abele et al., "Silicon Based Flame Retardant for Polycarbonate," ANTEC, 2009, 1351-1354.
International Search Report and Written Opinion mailed in International Patent Application No. PCT/US2014/035978 (Jul. 30, 2014).

* cited by examiner

*Primary Examiner* — Jeffrey Mullis
(74) *Attorney, Agent, or Firm* — Michael Best & Friedrich LLP

(57) ABSTRACT

Disclosed herein are compositions including a polycarbonate-siloxane copolymer and a silicone-based graft copolymer. The compositions may include one or more additional polymers, such as a bisphenol-A polycarbonate. The compositions may include additional components, such as anti-drip agents, and/or flame retardant salt additives. Also disclosed herein are articles including the compositions, methods of using the compositions, and processes for preparing the compositions.

2 Claims, No Drawings

POLYCARBONATE-SILOXANE COPOLYMER FLAME RETARDED WITH A SILICONE BASED CORE SHELL MODIFIER

CROSS-REFERENCE TO RELATED APPLICATION

This application is nonprovisional application claiming the benefit of U.S. Provisional Application Ser. No. 61/818,607 filed on May 2, 2013, which is hereby incorporated by reference in its entirety.

TECHNICAL FIELD

The present disclosure relates generally to flame retarded thermoplastic compositions, and more particularly, to flame retarded compositions including a polycarbonate-siloxane copolymer and a silicone-based graft copolymer.

BACKGROUND

Polycarbonates are polymers that may be derived from bisphenols and phosgene, or their derivatives. They are useful for forming a wide variety of products, such as by molding, extrusion, and thermoforming processes. Such products include articles and components that include auto parts, electronic appliances, and cell phone components. Because of their broad use, particularly in electronic applications and auto part applications, the desired properties of polycarbonates include high impact strength and toughness, heat resistance, weather and ozone resistance, and good ductility.

However, polycarbonate polymers are not inherently non-flammable. It is thus typically necessary to include flame retardant additives, such as halogenated or non-halogenated additives, that retard the flammability of the and/or reduce dripping. Halogenated flame retardants containing bromide and/or chloride are increasingly subject to regulatory restrictions. Non-halogenated alternatives, including various fillers, phosphorous-containing compounds, and certain salts, have been used. However, it has been difficult to meet strict flame retardance standards using these non-halogenated alternatives, particularly in thin wall samples, while maintaining the desired properties of impact strength and ductility.

Accordingly, there exists a need for improved polycarbonate compositions that exhibit good heat resistance, while maintaining physical and mechanical properties suitable for the intended application.

SUMMARY

In one aspect, disclosed is a composition comprising a polycarbonate-siloxane copolymer, a silicone-based graft copolymer, and an anti-drip agent. The silicone-based graft copolymer may be a silicone-based graft copolymer comprising (a) 60% to 80% by weight of a silicone core component, and (b) a graft polymer shell derived from at least methacrylic ester monomer. A flame bar comprising the composition may achieve a UL94 V0 rating at a thickness of 1.2 mm or 1.0 mm. The composition may have a notched Izod impact strength (NII) of greater than or equal to 500 J/m, measured at −40° C. according to ASTM D 256. The composition does not include aliphatic polyester-polycarbonate copolymers.

In certain embodiments, the composition has a 3.0 wt % siloxane to 6.0 wt % siloxane content, contributed from the polycarbonate-siloxane copolymer and optionally one or more additional polycarbonate-siloxane copolymers, based on total weight of the polycarbonate components of the composition.

In certain embodiments, the polycarbonate-siloxane copolymer has a siloxane content from 0.4 wt % to 25 wt %. The polycarbonate-siloxane copolymer may be a siloxane block co-polycarbonate comprising from about 3 wt % siloxane to about 25 wt % siloxane. The polycarbonate-siloxane copolymer may be selected from: a polycarbonate-siloxane copolymer having a weight average molecular weight of 22,500 Daltons to 23,500 Daltons and a siloxane content of 5.5 wt % to 6.5 wt %; a polycarbonate-siloxane copolymer having a weight average molecular weight of 17,800 Daltons to 18,800 Daltons and a siloxane content of 5.5 wt % to 6.5 wt %; and a polycarbonate-siloxane copolymer having a weight average molecular weight of 28,000 Daltons to 32,000 Daltons and a siloxane content of 18 wt % to 22 wt %; or any combination thereof; wherein the weight average molecular weight is measured by gel permeation chromatography using bisphenol-A polycarbonate standards.

In certain embodiments, the silicone-based graft copolymer may be present in the thermoplastic composition in an amount of about 0.5 wt % to about 15 wt %, based upon the total weight of the polycarbonate components in the composition. In certain embodiments, the silicone-based graft copolymer may be present in the thermoplastic composition in an amount of about 2 wt % to about 4 wt %, based upon the total weight of the polycarbonate components in the composition. In certain embodiments, the silicone-based graft copolymer is a silicone-based graft copolymer sold under the tradename KANE ACE™ MR-01 by Kaneka Corporation (Japan).

In certain embodiments, the composition further comprises a bisphenol-A polycarbonate. The bisphenol-A polycarbonate may be selected from: a cumyl phenol end capped bisphenol-A polycarbonate having a weight average molecular weight of 29,000 Daltons to 31,000 Daltons; a cumyl phenol end capped bisphenol-A polycarbonate having a weight average molecular weight of 21,000 Daltons to 23,000 Daltons; and a cumyl phenol end capped bisphenol-A polycarbonate having a weight average molecular weight of 17,000 Daltons to 19,000 Daltons; or any combination thereof; wherein the weight average molecular weight is measured by gel permeation chromatography using bisphenol-A polycarbonate standards.

In certain embodiments, the composition further comprises a flame retardant salt additive. The flame retardant salt may be potassium perfluorobutane sulfonate (KPFS), potassium diphenyl sulfone-3-sulfonate (KSS), or a combination thereof. The flame retardant salt may be potassium perfluorobutane sulfonate and may be present in an amount of about 0.07 wt % to about 0.09 wt %, based on the polycarbonate content of the composition. The flame retardant salt may be potassium diphenyl sulfone-3-sulfonate (KSS) and may be present in an amount of about 0.25 wt % to about 0.35 wt %, based on the polycarbonate content of the composition.

In certain embodiments, the composition further comprises titanium dioxide. In certain embodiments, the titanium dioxide may be present in amount of about 0.8 wt % to about 3.0 wt %, based on the polycarbonate content of the composition. In certain embodiments, the titanium dioxide may be present in amount of about 2.0 wt % to about 3.0 wt %, based on the polycarbonate content of the composition.

In certain embodiments, the composition further comprises an anti-drip agent. The anti-drip agent may be a fibril forming polytetrafluoroethylene (PTFE). The fibril forming polytetrafluoroethylene (PTFE) may be present in the composition in an amount of about 0.15 wt % to about 0.25 wt %, based on the polycarbonate content of the composition. The anti-drip agent may be a fibril forming polytetrafluoroethylene encapsulated by styrene-acrylonitrile copolymer (TSAN). The TSAN may be present in the composition in an amount of about 0.3 wt % to about 0.5 wt %, based on the polycarbonate content of the composition.

In certain embodiments, the composition achieves a UL94 V0 rating in the absence of a brominated and/or chlorinated flame retardant.

In certain embodiments, the composition may have a notched Izod impact strength (NII) of greater than or equal to 600 J/m, measured at −40° C. according to ASTM D 256. In certain embodiments, the composition may have a notched Izod impact strength (NII) of greater than or equal to 550 J/m, measured at −30° C. according to ASTM D 256.

In certain embodiments, the composition may have a melt volume flow rate of 5 to 25 $cm^3$/10 min. The composition may have a melt volume flow rate of about 14 to 17 $cm^3$/10 min. The melt volume flow rate may be measured using the ASTM D1238 method, 1.2 kg load, 300° C. temperature, 360 second dwell.

In certain embodiments, a flame bar comprising the composition demonstrates a probability of first time pass (pFTP) of the UL94 V0 test of 0.85 to 1.00, tested at a thickness of 1.2 mm or 1.0 mm.

In certain embodiments, the composition does not include a phosphorus containing flame retardant.

In certain embodiments, the silicone-based graft copolymer comprises 70% to 80% by weight of the silicone core component.

In another aspect, disclosed is a composition consisting of: a polycarbonate-siloxane copolymer; a silicone-based graft copolymer; at least one bisphenol-A polycarbonate; at least one anti-drip agent; and optionally at least one flame retardant salt additive and optionally at least one additive selected from an impact modifier, UV stabilizer, colorant, heat stabilizer, plasticizer, lubricant, mold release agent, filler, reinforcing agent, antioxidant agent, antistatic agent, blowing agent, anti-drip agent, radiation stabilizer, and a combination thereof flame bar comprising the composition may achieve a UL94 V0 rating at a thickness of 1.2 mm or 1.1 mm, or a flame bar comprising the composition may demonstrate a probability of first time pass (pFTP) of the UL94 V0 test of 0.85 to 1.00, tested at a thickness of 1.2 mm or 1.0 mm. The composition may have a notched Izod impact strength (NII) of greater than or equal to 500 J/m, measured at −40° C. according to ASTM D 256. The silicone-based graft copolymer may be a silicone-based graft copolymer comprising (a) 60% to 80% by weight of a silicone core component, and (b) a graft polymer shell derived from at least methacrylic ester monomer. The flame retardant salt additive may be selected from potassium perfluorobutane sulfonate (KPFS), potassium diphenyl sulfone-3-sulfonate (KSS), or a combination thereof.

In another aspect, disclosed is an article comprising a composition of the invention. The article may be at least one of an automotive bumper, an automotive exterior component, an automobile mirror housing, an automobile wheel cover, an automobile instrument panel or trim, an automobile glove box, an automobile door hardware or other interior trim, an automobile exterior light, an automobile part within the engine compartment, an agricultural tractor or device part, a construction equipment vehicle or device part, a marine or personal water craft part, an all-terrain vehicle or all-terrain vehicle part, plumbing equipment, a valve or pump, an air conditioning heating or cooling part, a furnace or heat pump part, a computer part, a computer router, a desk top printer, a large office/industrial printer, an electronics part, a projector part, an electronic display part, a copier part, a scanner part, an electronic printer toner cartridge, a hair drier, an iron, a coffee maker, a toaster, a washing machine or washing machine part, a microwave oven, an oven, a power tool, an electric component, an electric enclosure, a lighting part, a dental instrument, a medical instrument, a medical or dental lighting part, an aircraft part, a train or rail part, a seating component, a sidewall, a ceiling part, cookware, a medical instrument tray, an animal cage, fibers, a laser welded medical device, a cell phone part, a greenhouse component, a sun room component, a fire helmet, a safety shield, a gas pump part, a humidifier housing, a thermostat control housing, an air conditioner drain pan, an outdoor cabinet, a telecom enclosure or infrastructure, a Simple Network Detection System (SNIDS) device, a network interface device, a smoke detector, a component or device in a plenum space, a medical scanner, X-ray equipment, a construction or agricultural equipment, and a turbine blade.

In certain embodiments, the article or a material in the article may require a UL94 V0 rating performance. The article that requires a UL94 V0 rating performance may be at least one of a computer housing, a computer housing or business machine housing or part, a housing or part for monitors, a computer router, a copier, a desk top printer, a large office/industrial printer, a handheld electronic device housing, a housing for a hand-held device, a component for a light fixture, a humidifier housing, a thermostat control housing, an air conditioner drain pan, an outdoor cabinet, a telecom enclosure or infrastructure, a Simple Network Intrusion Detection System (SNIDS) device, a network interface device, a smoke detector, a component or device in a plenum space, a component for a medical application or a device, an electrical box or enclosure, and an electrical connector.

In another aspect, disclosed is a process for preparing an article comprising a composition disclosed herein. The process may include: (a) providing a composition of the invention; and (b) molding the composition of step (a) into an article.

In another aspect, disclosed is a method comprising blending a polycarbonate composition that includes a polycarbonate-siloxane copolymer; a silicone-based graft copolymer comprising 60% to 80% by weight of a silicone core component, and a graft polymer shell derived from at least methacrylic ester monomer; a bisphenol-A polycarbonate; an anti-drip agent; and optionally a flame retardant salt additive selected from potassium perfluorobutane sulfonate (KPFS), potassium diphenyl sulfone-3-sulfonate (KSS), or a combination thereof. A flame bar comprising the composition may achieve a UL94 V0 rating at a thickness of 1.2 mm or 1.0 mm, or a flame bar comprising the composition may demonstrate a probability of first time pass (pFTP) of the UL94 V0 test of 0.85 to 1.00, tested at a thickness of 1.2 mm or 1.0 mm. The composition may have a notched Izod impact strength (NII) of greater than or equal to 500 J/m, measured at −40° C. according to ASTM D 256. The composition does not include aliphatic polyester-polycarbonate copolymers. In certain embodiments, the composition comprises a flame retardant salt additive that is potassium diphenyl sulfone-3-sulfonate (KSS). In certain embodiments, the composition further comprises titanium dioxide ($TiO_2$). The method may further include injection molding the polycarbonate composition.

In another aspect, disclosed is a composition including: a polycarbonate-siloxane copolymer having a weight average molecular weight of 28,000 Daltons to 32,000 Daltons and a siloxane content of 18 wt % to 22 wt %, the polycarbonate-siloxane copolymer present in an amount of about 25 wt % based on the polycarbonate content of the composition; one or more bisphenol-A polycarbonates having a weight average molecular weight of 17,000 Daltons to 31,000 Daltons, the one or more bisphenol-A polycarbonates present in an amount of about 75 wt % based on the polycarbonate content of the composition; a silicone-based graft copolymer comprising (a) 60% to 80% by weight of a silicone core component, and (b) a graft polymer shell derived from at least methacrylic ester monomer, the silicone-based graft copolymer present in an amount of about 2 wt % to about 4 wt % based on the polycarbonate content of the composition; a styrene-acrylonitrile copolymer encapsulated polytetrafluoroethylene (TSAN), present in an amount of about 0.3 wt % to about 0.5 wt % based on the polycarbonate content of the composition; potassium diphenyl sulfone-3-sulfonate (KSS), present in an amount of about 0.25 wt % to about 0.35 wt % based on the polycarbonate content of the composition; and titanium dioxide, present in an amount of about 0.8 wt % to about 3.0 wt % based on the polycarbonate content of the composition; wherein a flame bar comprising the composition achieves a UL94 V0 rating at a thickness of 1.2 mm or 1.0 mm; wherein the composition has a notched Izod impact strength (NII) of greater than or equal to 500 J/m, measured at −40° C. according to ASTM D 256; and wherein the composition does not include aliphatic polyester-polycarbonate copolymers.

The composition may be used to provide an article selected from components and housings for cell phones and other portable electronic devices, housings for medical devices, telecomm enclosures, housings for outdoor electronics devices, solar collector components, and housings for scanners.

The compositions, articles, methods, and processes are further described herein.

DETAILED DESCRIPTION

Disclosed herein are thermoplastic compositions comprising a polycarbonate-polysiloxane copolymer and a silicone-based graft copolymer. The compositions may further comprise one or more additional components, and in particular, a bisphenol-A polycarbonate, a flame retardant salt additive, and/or an anti-drip agent.

The compositions exhibit improved flame retardant performance in thin wall part flame resistance testing versus the polycarbonate-siloxane copolymers and current commercial fire retarded polycarbonate-siloxanes, with negligible detrimental effects on other critical properties. In fact, the disclosed compositions provide an unexpected synergistic effect to enhance impact performance, while also improving flame resistance. The compositions are thus useful in the manufacture of a wide variety of articles, particularly thin-walled articles having improved flame retardance and good physical properties, such as impact strength and ductility.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of" the embodiments or elements presented herein, whether explicitly set forth or not.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

"Alkyl" as used herein may mean a linear, branched, or cyclic hydrocarbyl group, such as a methyl group, ethyl group, n-propyl group, isopropyl group, n-butyl group, isobutyl group, tert-butyl group, n-pentyl group, isopentyl group, n-hexyl group, isohexyl group, cyclopentyl group, cyclohexyl group, and the like.

"Aryl" as used herein may mean a substituted or unsubstituted aryl radical containing from 6 to 36 ring carbon atoms. Examples of aryl include, but are not limited to, a phenyl group, a bicyclic hydrocarbon fused ring system, or a tricyclic hydrocarbon fused ring system wherein one or more of the rings are a phenyl group.

"Arylalkyl" as used herein may mean an aryl, as defined herein, appended to the parent molecular moiety through an alkyl, as defined herein.

"Copolymer" as used herein may mean a polymer derived from two or more structural unit or monomeric species, as opposed to a homopolymer, which is derived from only one structural unit or monomer.

"$C_3$-$C_6$ cycloalkyl" as used herein may mean cyclopropyl, cyclobutyl, cyclopentyl or cyclohexyl.

"Glass Transition Temperature" or "Tg" as used herein may mean the maximum temperature that a polymer, such as a polycarbonate, will have one or more useful properties. These properties include impact resistance, stiffness, strength, and shape retention. The Tg of a polycarbonate therefore may be an indicator of its useful upper temperature limit, particularly in plastics applications. The Tg may be measured using a differential scanning calorimetry method and expressed in degrees Celsius.

The glass transition temperature of a polymer, such as a polycarbonate, may depend primarily on the composition of the polymer. Polycarbonates that are formed from monomers having more rigid and less flexible chemical structures than Bisphenol-A generally have higher glass transition temperatures than Bisphenol-A polycarbonate, while polycarbonates that are formed from monomers having less rigid and more flexible chemical structures than Bisphenol-A generally have lower glass transition temperatures than Bisphenol-A polycarbonate. For example, a polycarbonate formed from 33 mole % of a rigid monomer, 3,3-bis(4-hydroxyphenyl)-2-phenylisoindolin-1-one ("PPPBP"), and 67 mole % Bisphenol-A has a glass transition temperature of 198° C., while a polycarbonate formed from Bisphenol-A, but also having 6 wt % of siloxane units, a flexible monomer, has a glass transition temperature of 145° C.

Mixing of two or more polycarbonates having different glass transition temperatures may result in a glass transition temperature value for the mixture that is intermediate between the glass transition temperatures of the polycarbonates that are mixed.

The glass transition temperature of a polycarbonate may also be an indicator of the molding or extrusion temperatures required to form polycarbonate parts. The higher the glass transition temperature of the polycarbonate the higher the molding or extrusion temperatures that are needed to form polycarbonate parts.

The glass transition temperatures (Tg) described herein are measures of heat resistance of, for example, polycarbonate and polycarbonate blends. The Tg can be determined by differential scanning calorimetry. The calorimetry method may use a TA Instruments Q1000 instrument, for example, with setting of 20° C./min ramp rate and 40° C. start temperature and 200° C. end temperature "Halo" as used herein may be a substituent to which the prefix is attached is substituted with one or more independently selected halogen radicals. For example, "$C_1$-$C_6$ haloalkyl" means a $C_1$-$C_6$ alkyl substituent wherein one or more hydrogen atoms are replaced with independently selected halogen radicals. Non-limiting examples of $C_1$-$C_6$ haloalkyl include chloromethyl, 1-bromoethyl, fluoromethyl, difluoromethyl, trifluoromethyl, and 1,1,1-trifluoroethyl. It should be recognized that if a substituent is substituted by more than one halogen radical, those halogen radicals may be identical or different (unless otherwise stated).

"Halogen" or "halogen atom" as used herein may mean a fluorine, chlorine, and bromine or iodine atom.

"Heteroaryl" as used herein may mean any aromatic heterocyclic ring which may comprise an optionally benzocondensed 5 or 6 membered heterocycle with from 1 to 3 heteroatoms selected among N, O or S. Non limiting examples of heteroaryl groups may include pyridyl, pyrazinyl, pyrimidinyl, pyridazinyl, indolyl, imidazolyl, thiazolyl, isothiazolyl, pyrrolyl, phenyl-pyrrolyl, furyl, phenyl-furyl, oxazolyl, isoxazolyl, pyrazolyl, thienyl, benzothienyl, isoindolinyl, benzoimidazolyl, quinolinyl, isoquinolinyl, 1,2,3-triazolyl, 1-phenyl-1,2,3-triazolyl, and the like.

"Hindered phenol stabilizer" as used herein may mean 3,5-di-tert-butyl-4-hydroxyhydrocinnamic acid, octadecyl ester.

"Melt Volume Rate" (MVR) as used herein may mean the flow rate of a polymer in a melt phase as determined using the method of ASTM 1238-10. The MVR of a molten polymer is measured by determining the amount of polymer that flows through a capillary of a specific temperature over a specified time using standard weights at a fixed temperature. MVR is expressed in cubic centimeter per 10 minutes. The higher the MVR value of a polymer at a specific temperature, the greater the flow of that polymer at that specific temperature.

"PETS release agent" as used herein may mean pentaerythritol tetrastearate, mold release.

"Phosphite stabilizer" as used herein may mean tris-(2,4-di-tert-butylphenyl)phosphite.

"Polycarbonate" as used herein may mean an oligomer or polymer comprising residues of one or more polymer structural units, or monomers, joined by carbonate linkages.

"Straight or branched $C_1$-$C_3$ alkyl" or "straight or branched $C_1$-$C_3$ alkoxy" as used herein may mean methyl, ethyl, n-propyl, isopropyl, methoxy, ethoxy, n-propoxy and isopropoxy.

Unless otherwise indicated, each of the foregoing groups may be unsubstituted or substituted, provided that the substitution does not significantly adversely affect synthesis, stability, or use of the compound.

The terms "structural unit" and "monomer" are interchangeable as used herein.

"Thermal stability" as used herein refers to resistance of a polymer to molecular weight degradation under thermal conditions. Thus, a polymer with poor thermal stability may show significant molecular weight degradation under thermal conditions, such as during extrusion, molding, thermoforming, hot-pressing, and like conditions. Molecular weight degradation may also be manifest through color formation and/or in the degradation of other properties such as weatherability, gloss, mechanical properties, and/or thermal properties. Molecular weight degradation can also cause significant variation in processing conditions such as melt viscosity changes.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

Disclosed herein are thermoplastic compositions including a polycarbonate-siloxane copolymer, a silicone-based graft copolymer, and an anti-drip agent. The compositions may comprise one or more additional polymers, such as a bisphenol-A polycarbonate. The compositions may comprise additional components, such as a flame retardant salt additive and/or a colorant.

The compositions may have a siloxane content, contributed from the polycarbonate-siloxane copolymer(s), of 0.4 wt % siloxane to 6.0 wt % siloxane, 3.0 wt % siloxane to 6.0 wt % siloxane, or 3.5 wt % siloxane to 5.0 wt % siloxane, based on total weight of the polycarbonate component(s) of the composition. The compositions may have a siloxane content, contributed from the polycarbonate-siloxane copolymer(s), of 0.4 wt % siloxane (±10%), 0.5 wt % siloxane (±10%), 0.6 wt % siloxane (±10%), 0.7 wt % siloxane (±10%), 0.8 wt % siloxane (±10%), 0.9 wt % siloxane (±10%), 1.0 wt % siloxane (±10%), 1.1 wt % siloxane (±10%), 1.2 wt % siloxane (±10%), 1.3 wt % siloxane (±10%), 1.4 wt % siloxane (±10%), 1.5 wt % siloxane (±10%), 1.6 wt % siloxane (±10%), 1.7 wt % siloxane (±10%), 1.8 wt % siloxane (±10%), 1.9 wt % siloxane (±10%), 2.0 wt % siloxane (±10%), 2.1 wt % siloxane (±10%), 2.2 wt % siloxane (±10%), 2.3 wt % siloxane (±10%), 2.4 wt % siloxane (±10%), 2.5 wt % siloxane (±10%), 2.6 wt % siloxane (±10%), 2.7 wt % siloxane (±10%), 2.8 wt % siloxane (±10%), 2.9 wt % siloxane (±10%), 3.0 wt % siloxane (±10%), 3.1 wt % siloxane (±10%), 3.2 wt % siloxane (±10%), 3.3 wt % siloxane (±10%), 3.4 wt % siloxane (±10%), 3.5 wt % siloxane (±10%), 3.6 wt % siloxane (±10%), 3.7 wt % siloxane (±10%), 3.8 wt % siloxane (±10%), 3.9 wt % siloxane (±10%), 4.0 wt % siloxane (±10%), 4.1 wt % siloxane (±10%), 4.2 wt % siloxane (±10%), 4.3 wt % siloxane (±10%), 4.4 wt % siloxane (±10%), 4.5 wt % siloxane (±10%), 4.6 wt % siloxane (±10%), 4.7 wt % siloxane (±10%), 4.8 wt % siloxane (±10%), 4.9 wt % siloxane (±10%), 5.0 wt % siloxane (±10%), 5.1 wt % siloxane (±10%), 5.2 wt % siloxane (±10%), 5.3 wt % siloxane (±10%), 5.4 wt % siloxane (±10%) 5.5 wt % siloxane (±10%), 5.6 wt % siloxane (±10%), 5.7 wt % siloxane (±10%), 5.8 wt % siloxane (±10%), 5.9 wt % siloxane (±10%), or 6.0 wt % siloxane (±10%), based on total weight of the polycarbonate component(s) of the composition.

A material comprising the composition may be UL94 V0 compliant. For example, a flame bar comprising the composition may achieve a UL94 V0 rating. A flame bar formed from the composition may achieve a UL94 V0 rating at a thickness of: 3.0 mm (±10%) or less, 2.9 mm (±10%) or less, 2.8 mm (±10%) or less, 2.7 mm (±10%) or less, 2.6 mm (±10%) or less, 2.5 mm (±10%), 2.4 mm (±10%) or less, 2.3 mm (±10%) or less, 2.2 mm (±10%) or less, 2.1 mm (±10%) or less, 2.0 mm (±10%), 1.9 mm (±10%) or less, 1.8 mm (±10%) or less, 1.7 mm (±10%) or less, 1.6 mm (±10%) or less, 1.5 mm (±10%), 1.4 mm (±10%) or less, 1.3 mm (±10%) or less, 1.2 mm (±10%) or less, 1.1 mm (±10%) or less, 1.0 mm (±10%) or less, 0.9 mm (±10%) or less, or 0.8 mm (±10%) or less.

A material comprising the composition may achieve a high probability of first time pass "p(FTP)" that a particular sample formulation will achieve a UL 94 V0 "pass" rating in the conventional UL 94 testing of 5 bars. A "high probability of first time pass" may refer to a sample achieving a p(FTP) of 0.85 to 1.00. In certain embodiments, a probability of first time pass of 0.85 to 1.00 may be defined as passing the UL 94 V0 flame performance test.

A flame bar comprising the composition may demonstrate a high probability of first time pass (pFTP) of the UL94 V0 test at a thickness of: 3.0 mm (±10%) or less, 2.9 mm (±10%) or less, 2.8 mm (±10%) or less, 2.7 mm (±10%) or less, 2.6 mm (±10%) or less, 2.5 mm (±10%), 2.4 mm (±10%) or less, 2.3 mm (±10%) or less, 2.2 mm (±10%) or less, 2.1 mm (±10%) or less, 2.0 mm (±10%), 1.9 mm (±10%) or less, 1.8 mm (±10%) or less, 1.7 mm (±10%) or less, 1.6 mm (±10%) or less, 1.5 mm (±10%), 1.4 mm (±10%) or less, 1.3 mm (±10%) or less, 1.2 mm (±10%) or less, 1.1 mm (±10%) or less, 1.0 mm (±10%) or less, 0.9 mm (±10%) or less, or 0.8 mm (±10%) or less.

In certain embodiments, a flame bar comprising the composition may demonstrate a probability of first time pass (pFTP) of the UL94 V0 test of 0.85, 0.86, 0.87, 0.88, 0.89, 0.90, 0.91, 0.92, 0.93, 0.94, 0.95, 0.96, 0.97, 0.98, 0.99, or 1.00, tested at a thickness of 3.0 mm (±10%) or less, 2.9 mm (±10%) or less, 2.8 mm (±10%) or less, 2.7 mm (±10%) or less, 2.6 mm (±10%) or less, 2.5 mm (±10%), 2.4 mm (±10%) or less, 2.3 mm (±10%) or less, 2.2 mm (±10%) or less, 2.1 mm (±10%) or less, 2.0 mm (±10%), 1.9 mm (±10%) or less, 1.8 mm (±10%) or less, 1.7 mm (±10%) or less, 1.6 mm (±10%) or less, 1.5 mm (±10%), 1.4 mm (±10%) or less, 1.3 mm (±10%) or less, 1.2 mm (±10%) or less, 1.1 mm (±10%) or less, 1.0 mm (±10%) or less, 0.9 mm (±10%) or less, or 0.8 mm (±10%) or less.

The composition may have a melt volume flow rate (often abbreviated MVR), which measures the rate of extrusion of a composition through an orifice at a prescribed temperature and load.

In certain embodiments, the composition may have an MVR of 2 to 70 $cm^3$/10 min, 2 to 50 $cm^3$/10 min, 2 to 40 $cm^3$/10 min, 2 to 30 $cm^3$/10 min, 2 to 25 $cm^3$/10 min, 2 to 20 $cm^3$/10 min, 5 to 70 $cm^3$/10 min, 5 to 50 $cm^3$/10 min, 5 to 40 $cm^3$/10 min, 5 to 30 $cm^3$/10 min, 5 to 25 $cm^3$/10 min, 5 to 20 $cm^3$/10 min, 10 to 170 $cm^3$/10 min, 10 to 50 $cm^3$/10 min, 10 to 40 $cm^3$/10 min, 10 to 30 $cm^3$/10 min, 10 to 25 $cm^3$/10 min, or 10 to 20 $cm^3$/10 min, using the ASTM D1238 method, 1.2 kg load, 300° C. temperature, 360 second dwell. In certain embodiments, the composition may have an MVR measured using the ASTM D1238 method, 1.2 kg load, 300° C. temperature, 360 second dwell, of: 2.0 $cm^3$/10 min, 2.1 $cm^3$/10 min, 2.2 $cm^3$/10 min, 2.3 $cm^3$/10 min, 2.4 $cm^3$/10 min, 2.5 $cm^3$/10 min, 2.6 $cm^3$/10 min, 2.7 $cm^3$/10 min, 2.8 $cm^3$/10 min, 2.9 $cm^3$/10 min, 3.0 $cm^3$/10 min, 3.1 $cm^3$/10 min, 3.2 $cm^3$/10 min, 3.3 $cm^3$/10 min, 3.4 $cm^3$/10 min, 3.5 $cm^3$/10 min, 3.6 $cm^3$/10 min, 3.7 $cm^3$/10 min, 3.8 $cm^3$/10 min, 3.9 $cm^3$/10 min, 4.0 $cm^3$/10 min, 4.1 $cm^3$/10 min, 4.2 $cm^3$/10 min, 4.3 $cm^3$/10 min, 4.4 $cm^3$/10 min, 4.5 $cm^3$/10 min, 4.6 $cm^3$/10 min, 4.7 $cm^3$/10 min, 4.8 $cm^3$/10 min, 4.9 $cm^3$/10 min, 5.0 $cm^3$/10 min, 5.1 $cm^3$/10 min, 5.2 $cm^3$/10 min, 5.3 $cm^3$/10 min, 5.4 $cm^3$/10 min, 5.5 $cm^3$/10 min, 5.6 $cm^3$/10 min, 5.7 $cm^3$/10 min, 5.8 $cm^3$/10 min, 5.9 $cm^3$/10 min, 6.0 $cm^3$/10 min, 6.1 $cm^3$/10 min, 6.2 $cm^3$/10 min, 6.3 $cm^3$/10 min, 6.4 $cm^3$/10 min, 6.5 $cm^3$/10 min, 6.6 $cm^3$/10 min, 6.7 $cm^3$/10 min, 6.8 $cm^3$/10 min, 6.9 $cm^3$/10 min, 7.0 $cm^3$/10 min, 7.1 $cm^3$/10 min, 7.2 $cm^3$/10 min 7.3 $cm^3$/10 min, 7.4 $cm^3$/10 min, 7.5 $cm^3$/10 min, 7.6 $cm^3$/10 min, 7.7 $cm^3$/10 min, 7.8 $cm^3$/10 min, 7.9 $cm^3$/10 min, 8.0 $cm^3$/10 min, 8.1 $cm^3$/10 min, 8.2 $cm^3$/10 min, 8.3 $cm^3$/10 min, 8.4 $cm^3$/10 min, 8.5 $cm^3$/10 min, 8.6 $cm^3$/10 min, 8.7 $cm^3$/10 min, 8.8 $cm^3$/10 min, 8.9 $cm^3$/10 min, 9.0 $cm^3$/10 min, 9.1 $cm^3$/10 min, 9.2 $cm^3$/10 min, 9.3 $cm^3$/10 min, 9.4 $cm^3$/10 min, 9.5 $cm^3$/10 min, 9.6 $cm^3$/10 min, 9.7 $cm^3$/10 min, 9.8 $cm^3$/10 min, 9.9 $cm^3$/10 min, 10.0 $cm^3$/10 min, 10.1 $cm^3$/10 min, 10.2 $cm^3$/10 min, 10.3 $cm^3$/10 min, 10.4 $cm^3$/10 min, 10.5 $cm^3$/10 min, 10.6 $cm^3$/10 min, 10.7 $cm^3$/10 min, 10.8 $cm^3$/10 min, 10.9 $cm^3$/10 min, 11.0 $cm^3$/10 min, 11.1 $cm^3$/10 min, 11.2 $cm^3$/10 min, 11.3 $cm^3$/10 min, 11.4 $cm^3$/10 min, 11.5 $cm^3$/10 min, 11.6 $cm^3$/10 min, 11.7 $cm^3$/10 min, 11.8 $cm^3$/10 min, 11.9 $cm^3$/10 min, 12.0 $cm^3$/10 min, 12.1 $cm^3$/10 min, 12.2 $cm^3$/10 min, 12.3 $cm^3$/10 min, 12.4 $cm^3$/10 min, 12.5 $cm^3$/10 min, 12.6 $cm^3$/10 min, 12.7 $cm^3$/10 min, 12.8 $cm^3$/10 min, 12.9 $cm^3$/10 min, 13.0 $cm^3$/10 min, 13.1 $cm^3$/10 min, 13.2 $cm^3$/10 min, 13.3 $cm^3$/10 min, 13.4 $cm^3$/10 min, 13.5 $cm^3$/10 min, 13.6 $cm^3$/10 min, 13.7 $cm^3$/10 min, 13.8 $cm^3$/10 min, 13.9 $cm^3$/10 min, 14.0 $cm^3$/10 min, 14.1 $cm^3$/10 min, 14.2 $cm^3$/10 min, 14.3 $cm^3$/10 min, 14.4 $cm^3$/10 min. 14.5 $cm^3$/10 min, 14.6 $cm^3$/10 min, 14.7 $cm^3$/10 min, 14.8 $cm^3$/10 min, 14.9 $cm^3$/10 min, 15.0 $cm^3$/10 min, 15.1 $cm^3$/10 min, 15.2 $cm^3$/10 min, 15.3 $cm^3$/10 min, 15.4 $cm^3$/10 min, 15.5 $cm^3$/10 min, 15.6 $cm^3$/10 min, 15.7 $cm^3$/10 min, 15.8 $cm^3$/10 min, 15.9 $cm^3$/10 min, 16.0 $cm^3$/10 min, 16.1 $cm^3$/10 min, 16.2 $cm^3$/10 min, 16.3 $cm^3$/10 min, 16.4 $cm^3$/10 min, 16.5 $cm^3$/10 min, 16.6 $cm^3$/10 min, 16.7 $cm^3$/10 min, 16.8 $cm^3$/10 min, 16.9 $cm^3$/10 min, 17.0 $cm^3$/10 min, 17.1 $cm^3$/10 min, 17.2 $cm^3$/10 min, 17.3 $cm^3$/10 min, 17.4 $cm^3$/10 min, 17.5 $cm^3$/10 min, 17.6 $cm^3$/10 min, 17.7 $cm^3$/10 min, 17.8 $cm^3$/10 min, 17.9 $cm^3$/10 min, 18.0 $cm^3$/10 min, 18.1 $cm^3$/10 min, 18.2 $cm^3$/10 min, 18.3 $cm^3$/10 min, 18.4 $cm^3$/10 min, 18.5 $cm^3$/10 min, 18.6 $cm^3$/10 min 18.7 $cm^3$/10 min, 18.8 $cm^3$/10 min, 18.9 $cm^3$/10 min, 19.0 $cm^3$/10 min, 19.1 $cm^3$/10 min, 19.2 $cm^3$/10 min, 19.3 $cm^3$/10 min, 19.4 $cm^3$/10 min, 19.5 $cm^3$/10 min, 19.6 $cm^3$/10 min, 19.7 $cm^3$/10 min, 19.8 $cm^3$/10 min, 19.9 $cm^3$/10 min, 20.0 $cm^3$/10 min, 20.1 $cm^3$/10 min, 20.2 $cm^3$/10 min, 20.3 $cm^3$/10 min, 20.4 $cm^3$/10 min, 20.5 $cm^3$/10 min, 20.6 $cm^3$/10 min, 20.7 $cm^3$/10 min, 20.8 $cm^3$/10 min, 20.9 $cm^3$/10 min, 21.0 $cm^3$/10 min, 21.1 $cm^3$/10 min, 21.2 $cm^3$/10 min, 21.3 $cm^3$/10 min, 21.4 $cm^3$/10 min, 21.5 $cm^3$/10 min, 21.6 $cm^3$/10 min, 21.7 $cm^3$/10 min, 21.8 $cm^3$/10 min, 21.9 $cm^3$/10 min, 22.0 $cm^3$/10 min, 22.1 $cm^3$/10 min, 22.2 $cm^3$/10 min, 22.3 $cm^3$/10 min, 22.4 $cm^3$/10 min, 22.5 $cm^3$/10 min, 22.6 $cm^3$/10 min, 22.7 $cm^3$/10 min, 22.8 $cm^3$/10 min, 22.9 $cm^3$/10 min, 23.0 $cm^3$/10 min, 23.1 $cm^3$/10 min, 23.2 $cm^3$/10 min, 23.3 $cm^3$/10 min, 23.4 $cm^3$/10 min, 23.5 $cm^3$/10 min, 23.6 $cm^3$/10 min, 23.7 $cm^3$/10 min, 23.8 $cm^3$/10 min, 23.9 $cm^3$/10 min, 24.0 $cm^3$/10 min, 24.1 $cm^3$/10 min, 24.2 $cm^3$/10 min, 24.3 $cm^3$/10 min, 24.4 $cm^3$/10 min, 24.5 $cm^3$/10 min, 24.6 $cm^3$/10 min, 24.7 $cm^3$/10 min, 24.8 $cm^3$/10 min, 24.9 cm³/10 min, 25.0 cm³/10 min, 25.1 cm³/10 min, 25.2 cm³/10 min, 25.3 cm³/10 min, 25.4 cm³/10 min, 25.5 cm³/10 min, 25.6 cm³/10 min, 25.7 cm³/10 min, 25.8 cm³/10 min, 25.9 cm³/10 min, 26.0 cm³/10 min, 26.1 cm³/10 min, 26.2 cm³/10 min, 26.3 cm³/10 min, 26.4 cm³/10 min, 26.5 cm³/10 min, 26.6 cm³/10 min, 26.7 cm³/10 min, 26.8 cm³/10 min, 26.9 cm³/10 min, 27.0 cm³/10 min, 27.1 cm³/10 min, 27.2 cm³/10 min, 27.3 cm³/10 min, 27.4 cm³/10 min, 27.5 cm³/10 min, 27.6 cm³/10 min, 27.7 cm³/10 min, 27.8 cm³/10 min, 27.9 cm³/10 min, 28.0 cm³/10 min, 28.1 cm³/10 min, 28.2 cm³/10 min, 28.3 cm³/10 min, 28.4 cm³/10 min, 28.5 cm³/10 min, 28.6 cm³/10 min, 28.7 cm³/10 min, 28.8 cm³/10 min, 28.9 cm³/10 min, 29.0 cm³/10 min, 29.1 cm³/10 min, 29.2 cm³/10 min, 29.3 cm³/10 min, 29.4 cm³/10 min, 29.5 cm³/10 min, 29.6 cm³/10 min, 29.7 cm³/10 min, 29.8 cm³/10 min, 29.9 cm³/10 min, 30.0 cm³/10 min, 30.1 cm³/10 min, 30.2 cm³/10 min, 30.3 cm³/10 min, 30.4 cm³/10 min, 30.5 cm³/10 min, 30.6 cm³/10 min, 30.7 cm³/10 min, 30.8 cm³/10 min, 30.9 cm³/10 min, 31.0 cm³/10 min, 31.1 cm³/10 min, 31.2 cm³/10 min, 31.3 cm³/10 min, 31.4 cm³/10 min, 31.5 cm³/10 min, 31.6 cm³/10 min, 31.7 cm³/10 min, 31.8 cm³/10 min, 31.9 cm³/10 min, 32.0 cm³/10 min, 32.1 cm³/10 min, 32.2 cm³/10 min, 32.3 cm³/10 min, 32.4 cm³/10 min, 32.5 cm³/10 min, 32.6 cm³/10 min, 32.7 cm³/10 min, 32.8 cm³/10 min, 32.9 cm³/10 min, 33.0 cm³/10 min, 33.1 cm³/10 min, 33.2 cm³/10 min, 33.3 cm³/10 min, 33.4 cm³/10 min, 33.5 cm³/10 min, 33.6 cm³/10 min, 33.7 cm³/10 min, 33.8 cm³/10 min, 33.9 cm³/10 min, 34.0 cm³/10 min, 34.1 cm³/10 min, 34.2 cm³/10 min, 34.3 cm³/10 min, 34.4 cm³/10 min, 34.5 cm³/10 min, 34.6 cm³/10 min, 34.7 cm³/10 min, 34.8 cm³/10 min, 34.9 cm³/10 min, or 35.0 cm³/10 min.

In certain embodiments, the composition may have an MVR of 2 to 70 cm³/10 min, 2 to 50 cm³/10 min, 2 to 40 cm³/10 min, 2 to 30 cm³/10 min, 2 to 25 cm³/10 min, 2 to 20 cm³/10 min, 5 to 70 cm³/10 min, 5 to 50 cm³/10 min, 5 to 40 cm³/10 min, 5 to 30 cm³/10 min, 5 to 25 cm³/10 min, 5 to 20 cm³/10 min, 10 to 170 cm³/10 min, 10 to 50 cm³/10 min, 10 to 40 cm³/10 min, 10 to 30 cm³/10 min, 10 to 25 cm³/10 min, or 10 to 20 cm³/10 min, using the ASTM D1238 method, 1.2 kg load, 300° C. temperature, 1080 second dwell. In certain embodiments, the composition may have an MVR measured using the ASTM D1238 method, 1.2 kg load, 300° C. temperature, 1080 second dwell, of: 2.0 cm³/10 min, 2.1 cm³/10 min, 2.2 cm³/10 min, 2.3 cm³/10 min, 2.4 cm³/10 min, 2.5 cm³/10 min, 2.6 cm³/10 min, 2.7 cm³/10 min, 2.8 cm³/10 min, 2.9 cm³/10 min, 3.0 cm³/10 min, 3.1 cm³/10 min, 3.2 cm³/10 min, 3.3 cm³/10 min, 3.4 cm³/10 min, 3.5 cm³/10 min, 3.6 cm³/10 min, 3.7 cm³/10 min, 3.8 cm³/10 min, 3.9 cm³/10 min, 4.0 cm³/10 min, 4.1 cm³/10 min, 4.2 cm³/10 min, 4.3 cm³/10 min, 4.4 cm³/10 min, 4.5 cm³/10 min, 4.6 cm³/10 min, 4.7 cm³/10 min, 4.8 cm³/10 min, 4.9 cm³/10 min, 5.0 cm³/10 min, 5.1 cm³/10 min, 5.2 cm³/10 min, 5.3 cm³/10 min, 5.4 cm³/10 min, 5.5 cm³/10 min, 5.6 cm³/10 min, 5.7 cm³/10 min, 5.8 cm³/10 min, 5.9 cm³/10 min, 6.0 cm³/10 min, 6.1 cm³/10 min, 6.2 cm³/10 min, 6.3 cm³/10 min, 6.4 cm³/10 min, 6.5 cm³/10 min, 6.6 cm³/10 min, 6.7 cm³/10 min, 6.8 cm³/10 min, 6.9 cm³/10 min, 7.0 cm³/10 min, 7.1 cm³/10 min, 7.2 cm³/10 min 7.3 cm³/10 min, 7.4 cm³/10 min, 7.5 cm³/10 min, 7.6 cm³/10 min, 7.7 cm³/10 min, 7.8 cm³/10 min, 7.9 cm³/10 min, 8.0 cm³/10 min, 8.1 cm³/10 min, 8.2 cm³/10 min, 8.3 cm³/10 min, 8.4 cm³/10 min, 8.5 cm³/10 min, 8.6 cm³/10 min, 8.7 cm³/10 min, 8.8 cm³/10 min, 8.9 cm³/10 min, 9.0 cm³/10 min, 9.1 cm³/10 min, 9.2 cm³/10 min, 9.3 cm³/10 min, 9.4 cm³/10 min, 9.5 cm³/10 min, 9.6 cm³/10 min, 9.7 cm³/10 min, 9.8 cm³/10 min, 9.9 cm³/10 min, 10.0 cm³/10 min, 10.1 cm³/10 min, 10.2 cm³/10 min, 10.3 cm³/10 min, 10.4 cm³/10 min, 10.5 cm³/10 min, 10.6 cm³/10 min, 10.7 cm³/10 min, 10.8 cm³/10 min, 10.9 cm³/10 min, 11.0 cm³/10 min, 11.1 cm³/10 min, 11.2 cm³/10 min, 11.3 cm³/10 min, 11.4 cm³/10 min, 11.5 cm³/10 min, 11.6 cm³/10 min, 11.7 cm³/10 min, 11.8 cm³/10 min, 11.9 cm³/10 min, 12.0 cm³/10 min, 12.1 cm³/10 min, 12.2 cm³/10 min, 12.3 cm³/10 min, 12.4 cm³/10 min, 12.5 cm³/10 min, 12.6 cm³/10 min, 12.7 cm³/10 min, 12.8 cm³/10 min, 12.9 cm³/10 min, 13.0 cm³/10 min, 13.1 cm³/10 min, 13.2 cm³/10 min, 13.3 cm³/10 min, 13.4 cm³/10 min, 13.5 cm³/10 min, 13.6 cm³/10 min, 13.7 cm³/10 min, 13.8 cm³/10 min, 13.9 cm³/10 min, 14.0 cm³/10 min, 14.1 cm³/10 min, 14.2 cm³/10 min, 14.3 cm³/10 min, 14.4 cm³/10 min. 14.5 cm³/10 min, 14.6 cm³/10 min, 14.7 cm³/10 min, 14.8 cm³/10 min, 14.9 cm³/10 min, 15.0 cm³/10 min, 15.1 cm³/10 min, 15.2 cm³/10 min, 15.3 cm³/10 min, 15.4 cm³/10 min, 15.5 cm³/10 min, 15.6 cm³/10 min, 15.7 cm³/10 min, 15.8 cm³/10 min, 15.9 cm³/10 min, 16.0 cm³/10 min, 16.1 cm³/10 min, 16.2 cm³/10 min, 16.3 cm³/10 min, 16.4 cm³/10 min, 16.5 cm³/10 min, 16.6 cm³/10 min, 16.7 cm³/10 min, 16.8 cm³/10 min, 16.9 cm³/10 min, 17.0 cm³/10 min, 17.1 cm³/10 min, 17.2 cm³/10 min, 17.3 cm³/10 min, 17.4 cm³/10 min, 17.5 cm³/10 min, 17.6 cm³/10 min, 17.7 cm³/10 min, 17.8 cm³/10 min, 17.9 cm³/10 min, 18.0 cm³/10 min, 18.1 cm³/10 min, 18.2 cm³/10 min, 18.3 cm³/10 min, 18.4 cm³/10 min, 18.5 cm³/10 min, 18.6 cm³/10 min 18.7 cm³/10 min, 18.8 cm³/10 min, 18.9 cm³/10 min, 19.0 cm³/10 min, 19.1 cm³/10 min, 19.2 cm³/10 min, 19.3 cm³/10 min, 19.4 cm³/10 min, 19.5 cm³/10 min, 19.6 cm³/10 min, 19.7 cm³/10 min, 19.8 cm³/10 min, 19.9 cm³/10 min, 20.0 cm³/10 min, 20.1 cm³/10 min, 20.2 cm³/10 min, 20.3 cm³/10 min, 20.4 cm³/10 min, 20.5 cm³/10 min, 20.6 cm³/10 min, 20.7 cm³/10 min, 20.8 cm³/10 min, 20.9 cm³/10 min, 21.0 cm³/10 min, 21.1 cm³/10 min, 21.2 cm³/10 min, 21.3 cm³/10 min, 21.4 cm³/10 min, 21.5 cm³/10 min, 21.6 cm³/10 min, 21.7 cm³/10 min, 21.8 cm³/10 min, 21.9 cm³/10 min, 22.0 cm³/10 min, 22.1 cm³/10 min, 22.2 cm³/10 min, 22.3 cm³/10 min, 22.4 cm³/10 min, 22.5 cm³/10 min, 22.6 cm³/10 min, 22.7 cm³/10 min, 22.8 cm³/10 min, 22.9 cm³/10 min, 23.0 cm³/10 min, 23.1 cm³/10 min, 23.2 cm³/10 min, 23.3 cm³/10 min, 23.4 cm³/10 min, 23.5 cm³/10 min, 23.6 cm³/10 min, 23.7 cm³/10 min, 23.8 cm³/10 min, 23.9 cm³/10 min, 24.0 cm³/10 min, 24.1 cm³/10 min, 24.2 cm³/10 min, 24.3 cm³/10 min, 24.4 cm³/10 min, 24.5 cm³/10 min, 24.6 cm³/10 min, 24.7 cm³/10 min, 24.8 cm³/10 min, 24.9 cm³/10 min, 25.0 cm³/10 min, 25.1 cm³/10 min, 25.2 cm³/10 min, 25.3 cm³/10 min, 25.4 cm³/10 min, 25.5 cm³/10 min, 25.6 cm³/10 min, 25.7 cm³/10 min, 25.8 cm³/10 min, 25.9 cm³/10 min, 26.0 cm³/10 min, 26.1 cm³/10 min, 26.2 cm³/10 min, 26.3 cm³/10 min, 26.4 cm³/10 min, 26.5 cm³/10 min, 26.6 cm³/10 min, 26.7 cm³/10 min, 26.8 cm³/10 min, 26.9 cm³/10 min, 27.0 cm³/10 min, 27.1 cm³/10 min, 27.2 cm³/10 min, 27.3 cm³/10 min, 27.4 cm³/10 min, 27.5 cm³/10 min, 27.6 cm³/10 min, 27.7 cm³/10 min, 27.8 cm³/10 min, 27.9 cm³/10 min, 28.0 cm³/10 min, 28.1 cm³/10 min, 28.2 cm³/10 min, 28.3 cm³/10 min, 28.4 cm³/10 min, 28.5 cm³/10 min, 28.6 cm³/10 min, 28.7 cm³/10 min, 28.8 cm³/10 min, 28.9 cm³/10 min, 29.0 cm³/10 min, 29.1 cm³/10 min, 29.2 cm³/10 min, 29.3 cm³/10 min, 29.4 cm³/10 min, 29.5 cm³/10 min, 29.6 cm³/10 min, 29.7 cm³/10 min, 29.8 cm³/10 min, 29.9 cm³/10 min, 30.0 cm³/10 min, 30.1 cm³/10 min, 30.2 cm³/10 min, 30.3 cm³/10 min, 30.4 cm³/10 min, 30.5 cm³/10 min, 30.6 cm³/10 min, 30.7 cm³/10 min, 30.8 cm³/10 min, 30.9 cm³/10 min, 31.0 cm³/10 min, 31.1 cm³/10 min, 31.2 cm³/10 min, 31.3 cm³/10 min, 31.4 cm³/10 min, 31.5 cm³/10 min, 31.6 cm³/10 min, 31.7 cm³/10 min, 31.8 cm³/10 min, 31.9 cm³/10 min, 32.0 cm³/10 min, 32.1 cm³/10 min, 32.2 cm³/10 min, 32.3 cm³/10 min, 32.4 cm³/10 min, 32.5 cm³/10 min, 32.6 cm³/10 min, 32.7 cm³/10 min, 32.8 cm³/10 min, 32.9 cm³/10 min, 33.0 cm³/10 min, 33.1 cm³/10 min, 33.2 cm³/10 min, 33.3 cm³/10 min, 33.4 cm³/10 min, 33.5 cm³/10 min, 33.6 cm³/10 min, 33.7 cm³/10 min, 33.8 cm³/10 min, 33.9 cm³/10 min, 34.0 cm³/10 min, 34.1 cm³/10 min, 34.2 cm³/10 min, 34.3 cm³/10 min, 34.4 cm³/10 min, 34.5 cm³/10 min, 34.6 cm³/10 min, 34.7 cm³/10 min, 34.8 cm³/10 min, 34.9 cm³/10 min, or 35.0 cm³/10 min.

In certain embodiments, the compositions may have a modulus of elasticity of greater than or equal to 1900 megapascals (MPa), greater than or equal to 2000 MPa, greater than or equal to 2100 MPa, greater than or equal to 2200 MPa, or greater than or equal to 2300 MPa, as measured by ASTM D 790 at 1.3 mm/min, 50 mm span.

In certain embodiments, the compositions may have an elongation at break of 100% to about 200%, measured according to ASTM D 638. In certain embodiments, the compositions may have an elongation at break of about 100%, about 110%, about 120%, about 130%, about 140%, about 150%, about 160%, about 170%, about 180%, about 190%, or about 200%, measured according to ASTM D 638.

In certain embodiments, the compositions may have a flexural modulus of 2100 to 2600 megapascals (MPa). In certain embodiments, the compositions may have a flexural modulus of about 2100 MPa, about 2200 MPa, about 2300 MPa, about 2400 MPa, about 2500 MPa, or about 2600 MPa.

In certain embodiments, the compositions may have a tensile strength at break of greater than or equal to 45 megapascals (MPa), greater than or equal to 46 MPa, greater than or equal to 47 MPa, greater than or equal to 48 MPa, greater than or equal to 49 MPa, greater than or equal to 50 MPa, greater than or equal to 51 MPa, greater than or equal to 52 MPa, greater than or equal to 53 MPa, greater than or equal to 54 MPa, greater than or equal to 55 MPa, greater than or equal to 56 MPa, greater than or equal to 57 MPa, greater than or equal to 58 MPa, greater than or equal to 59 MPa, greater than or equal to 60 MPa, greater than or equal to 61 MPa, greater than or equal to 62 MPa, greater than or equal to 63 MPa, greater than or equal to 64 MPa, greater than or equal to 65 MPa, greater than or equal to 66 MPa, greater than or equal to 67 MPa, greater than or equal to 68 MPa, greater than or equal to 69 MPa, greater than or equal to 70 MPa, greater than or equal to 71 MPa, greater than or equal to 72 MPa, greater than or equal to 73 MPa, greater than or equal to 74 MPa, or greater than or equal to 75 MPa, as measured by ASTM D 638 Type I at 50 mm/min.

In certain embodiments, the compositions may possess a ductility of greater than or equal to 60%, greater than or equal to 65%, greater than or equal to 70%, greater than or equal to 75%, greater than or equal to 80%, greater than or equal to 85%, greater than or equal to 90%, greater than or equal to 95%, or 100% in a notched Izod test at −40° C., −30° C., −20° C., −15° C., −10° C., 0° C., 5° C., 10° C., 15° C., 20° C., 23° C., 25° C., 30° C., or 35° C. at a thickness of 3.2 mm according to ASTM D 256-10.

In certain embodiments, the compositions may have a notched Izod impact strength (NII) of greater than or equal to 500 J/m, greater than or equal to 550 J/m, greater than or equal to 600 J/m, greater than or equal to 650 J/m, greater than or equal to 700 J/m, greater than or equal to 750 J/m, greater than or equal to 800 J/m, greater than or equal to 850 J/m, greater than or equal to 900 J/m, greater than or equal to 950 J/m, or greater than or equal to 1000 J/m, measured at −40° C., −30° C., −20° C., −15° C., −10° C., 0° C., 5° C., 10° C., 15° C., 20° C., 23° C., 25° C., 30° C., or 35° C. according to ASTM D 256. In certain embodiments, the compositions may have a notched Izod impact strength (NII) of about 550 J/m at −40° C., −30° C., −20° C., −15° C., −10° C., 0° C., 5° C., 10° C., 15° C., 20° C., 23° C., 25° C., 30° C., or 35° C. according to ASTM D 256

The compositions comprise at least one polycarbonate that is a polycarbonate-siloxane copolymer.

The polycarbonate-siloxane copolymer may be present in the thermoplastic composition in an amount of about 10 wt % to about 90 wt %, or about 15 wt % to about 85 wt %, based upon the total weight of the polycarbonate components in the composition. In certain embodiments, the polycarbonate-polysiloxane copolymer is present in the thermoplastic composition in an amount of about 10 wt %, about 15 wt %, about 20 wt %, about 25 wt %, about 30 wt %, about 35 wt %, about 40 wt %, about 45 wt %, about 50 wt %, about 55 wt %, about 60 wt %, about 65 wt %, about 70 wt %, about 75 wt %, about 80 wt %, about 85 wt %, or about 90 wt %, based upon the total weight of the polycarbonate components in the composition. In certain embodiments, the polycarbonate-polysiloxane copolymer is present in the thermoplastic composition in an amount of 17.5 wt %, 25 wt %, 40 wt %, 58 wt %, or 83 wt %, based upon the total weight of the polycarbonate components in the composition.

The polycarbonate-siloxane copolymer comprises carbonate structural units and siloxane structural units. The monomers of the polycarbonate-siloxane copolymer may be randomly incorporated into the copolymer. For example, a polycarbonate-siloxane copolymer of the invention may be arranged in an alternating sequence following a statistical distribution, which is independent of the mole ratio of the structural units present in the polymer chain. A random polycarbonate-siloxane copolymer may have a structure, which can be indicated by the presence of several block sequences (I-I) and (O-O) and alternate sequences (I-O) or (O-I), that follow a statistical distribution. In a random x:(1-x) copolymer, wherein x is the mole percent of a first monomer(s) and 1-x is the mole percent of the other monomers, one can calculate the distribution of each monomer using peak area values determined by $^{13}$C NMR, for example.

A polycarbonate-siloxane copolymer of the invention may have alternating I and O units (-I-O-I-O-I-O-I-O-), or I and O units arranged in a repeating sequence (e.g. a periodic copolymer having the formula: (I-O-I-O-O-I-I-I-I-O-O-O)n). The polycarbonate-siloxane copolymer may be a statistical copolymer in which the sequence of monomer residues follows a statistical rule. For example, if the probability of finding a given type monomer residue at a particular point in the chain is equal to the mole fraction of that monomer residue in the chain, then the polymer may be referred to as a truly random copolymer. The polycarbonate-siloxane copolymer may be a block copolymer that comprises two or more homopolymer subunits linked by covalent bonds (-I-I-I-I-I-O-O-O-O-O-). The union of the homopolymer subunits may require an intermediate non-repeating subunit, known as a junction block. Block copolymers with two or three distinct blocks are called diblock copolymers and triblock copolymers, respectively.

The polycarbonate-siloxane copolymer may include other types of polymer units. The polycarbonate-siloxane copolymer may thus comprise repeating units derived from multiple monomers (e.g. a second, third, fourth, fifth, sixth, etc., other monomer compound).

The polycarbonate-siloxane copolymer of the invention may include any suitable mole % of selected monomer units. The polymers may comprise about 1% to about 99.5%, about 5% to about 95%, about 10% to about 90%, about 15% to about 85%, about 20% to about 80%, about 25% to about 75%, about 30% to about 70%, about 35% to about 65%, about 40% to about 60%, or about 45% to about 55% mole % of a selected monomer unit.

The polycarbonate-siloxane copolymer of the invention may include any suitable wt % of siloxane content. In certain embodiments, the polycarbonate-siloxane copolymer has a siloxane content from 0.4 wt % to 25 wt %. In certain embodiments, the polycarbonate-siloxane copolymer is a siloxane block co-polycarbonate comprising from about 6 wt % siloxane (±10%) to about 20 wt % siloxane (±10%). In certain embodiments, the polycarbonate-siloxane copolymer is a siloxane block co-polycarbonate comprising 1 wt % siloxane (±10%), 2 wt % siloxane (±10%), 3 wt % siloxane (±10%), 4 wt % siloxane (±10%), 5 wt % siloxane (±10%), 6 wt % siloxane (±10%), 7 wt % siloxane (±10%), 8 wt % siloxane (±10%), 9 wt % siloxane (±10%), 10 wt % siloxane (±10%), 11 wt % siloxane (±10%), 12 wt % siloxane (±10%), 13 wt % siloxane (±10%), 14 wt % siloxane (±10%), 15 wt % siloxane (±10%), 16 wt % siloxane (±10%), 17 wt % siloxane (±10%), 18 wt % siloxane (±10%), 19 wt % siloxane (±10%), 20 wt % siloxane (±10%), 21 wt % siloxane (±10%), 22 wt % siloxane (±10%), 23 wt % siloxane (±10%), 24 wt % siloxane (±10%), or 25 wt % siloxane (±10%).

The polycarbonate-siloxane copolymer may have a weight average molecular weight (Mw) of about 1,500 to about 150,000 Daltons [±1,000 Daltons], of about 10,000 to about 50,000 Daltons [±1,000 Daltons], of about 15,000 to about 35,000 Daltons [±1,000 Daltons], or of about 20,000 to about 30,000 Daltons [±1,000 Daltons]. In certain embodiments, the polycarbonate-siloxane copolymer has a weight average molecular weight of about 15,000 Daltons [±1,000 Daltons], about 16,000 Daltons [±1,000 Daltons], about 17,000 Daltons [±1,000 Daltons], about 18,000 Daltons [±1,000 Daltons], about 19,000 Daltons [±1,000 Daltons], about 20,000 Daltons [±1,000 Daltons], about 21,000 Daltons [±1,000 Daltons], about 22,000 Daltons [±1,000 Daltons], about 23,000 Daltons [±1,000 Daltons], about 24,000 Daltons [±1,000 Daltons], about 25,000 Daltons [±1,000 Daltons], about 26,000 Daltons [±1,000 Daltons], about 27,000 Daltons [±1,000 Daltons], about 28,000 Daltons [±1,000 Daltons], about 29,000 Daltons [±1,000 Daltons], about 30,000 Daltons [±1,000 Daltons], about 31,000 Daltons [±1,000 Daltons], about 32,000 Daltons [±1,000 Daltons], about 33,000 Daltons [±1,000 Daltons], about 34,000 Daltons [±1,000 Daltons], or about 35,000 Daltons [±1,000 Daltons]. Molecular weight determinations may be performed using gel permeation chromatography (GPC), using a cross-linked styrene-divinylbenzene column and calibrated to bisphenol-A polycarbonate references using a UV-VIS detector set at 264 nm. Samples may be prepared at a concentration of about 1 mg/ml, and eluted at a flow rate of about 1.0 ml/min.

The polycarbonate-siloxane copolymer may be a high-flow or low-flow polycarbonate-siloxane.

In certain embodiments, the polycarbonate-siloxane copolymer is a polycarbonate-siloxane copolymer having a molecular weight of 22,500 Daltons to 23,500 Daltons and a siloxane content of 5.5 wt % to 6.5 wt % (referred to herein as "PC-siloxane-1"). Such a may be prepared by methods described in U.S. Pat. Nos. 6,870,013, 6,723,864 and 6,833,422, which are hereby incorporated by reference in their entirety. In certain embodiments, the polycarbonate-siloxane copolymer is a polycarbonate-siloxane copolymer having a molecular weight of 17,800 Daltons to 18,800 Daltons and a siloxane content of 5.5 wt % to 6.5 wt % (referred to herein as "PC-siloxane-2"). Such a may be prepared by methods described in U.S. Pat. Nos. 6,870,013, 6,723,864 and 6,833,422, which are hereby incorporated by reference in their entirety. In certain embodiments, the polycarbonate-siloxane copolymer is a polycarbonate-siloxane copolymer having a molecular weight of 28,000 Daltons to 32,000 Daltons and a siloxane content of 18 wt % to 22 wt % (referred to herein as "PC-siloxane-3"). Such a may be prepared by the method described in U.S. Pat. No. 6,072,011, which is hereby incorporated by reference in its entirety.

copolymers may have formula (1):

wherein $R^{100}$ may comprise any suitable organic group, such as an aliphatic, alicyclic, or aromatic group, or any combination thereof. In certain embodiments, $R^{100}$ in the carbonate units of formula (1) may be a $C_6$-$C_{36}$ aromatic group wherein at least one moiety is aromatic.

In certain embodiments, each $R^{100}$ may be an aromatic organic group, for example, a group of formula (2):

wherein each of the $A^1$ and $A^2$ is a monocyclic divalent aryl group and $Y^1$ is a bridging group having one or two atoms that separate $A^1$ and $A^2$. For example, one atom may separate $A^1$ from $A^2$, with illustrative examples of these groups including —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecyclidene, cyclododecylidene, and adamantylidene. The bridging group of $Y^1$ may be a hydrocarbon group or a saturated hydrocarbon group such as methylene, cyclohexylidene, or isopropylidene.

Each $R^{100}$ may be derived from a dihydroxy monomer unit. The dihydroxy monomer unit may have formula (3):

wherein each of the $A^1$ and $A^2$ is a monocyclic divalent aryl group and $Y^1$ is a bridging group having one or two atoms that separate $A^1$ and $A^2$. For example, one atom may separate $A^1$ from $A^2$, with illustrative examples of these groups including —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecyclidene, cyclododecylidene, and adamantylidene. The bridging group of $Y^1$ may be a hydrocarbon group or a saturated hydrocarbon group such as methylene, cyclohexylidene, or isopropylidene.

The dihydroxy monomer unit of formula (3) may include bisphenol compounds of the general formula (4):

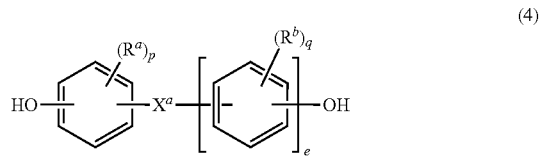

wherein $X^a$ may be a bridging group connecting the two hydroxy-substituted aromatic groups, where the bridging group and the hydroxy substituent of each $C_6$ arylene group are disposed ortho, meta, or para (specifically para) to each other on the $C_6$ arylene group. For example, the bridging group $X^a$ may be single bond, —O—, —S—, —C(O)—, or a $C_1$-$C_{18}$ organic group. The $C_1$-$C_{18}$ organic bridging group may be cyclic or acyclic, aromatic or non-aromatic, and can further comprise heteroatoms such as halogens, oxygen, nitrogen, sulfur, silicon, or phosphorous. The $C_1$-$C_{18}$ organic group can be disposed such that the $C_6$ arylene groups connected thereto are each connected to a common alkylidene carbon or to different carbons of the $C_1$-$C_{18}$ organic bridging group. $R^a$ and $R^b$ may each represent a halogen, $C_1$-$C_{12}$ alkyl group or combination thereof. For example, $R^a$ and $R^b$ may each be a $C_1$-$C_3$ alkyl group, specifically methyl, disposed ortho to the hydroxy group on each arylene group. The designation (e) is 0 or 1. The numbers p and q are each independently integers of 0 to 4. It will be understood that Ra is hydrogen when p is 0, and likewise $R^b$ is hydrogen when q is 0.

In certain embodiments, $X^a$ may be substituted or unsubstituted $C_3$-$C_{18}$ cycloalkylidene, a $C_1$-$C_{25}$ alkylidene of formula —$C(R^c)(R^d)$— wherein $R^c$ and $R^d$ are each independently hydrogen, $C_1$-$C_{12}$ alkyl, $C_1$-$C_{12}$ cycloalkyl, $C_7$-$C_{12}$ arylalkyl, $C_6$-$C_{12}$ aryl, $C_1$-$C_{12}$ heteroalkyl, or cyclic $C_7$-$C_{12}$ heteroarylalkyl, or a group of the formula —$C(=R^e)$— wherein $R^e$ is a divalent $C_1$-$C_{12}$ hydrocarbon group. This may include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene. A specific example wherein $X^a$ is a substituted cycloalkylidene is the cyclohexylidene-bridged, alkyl-substituted bisphenol of formula (5):

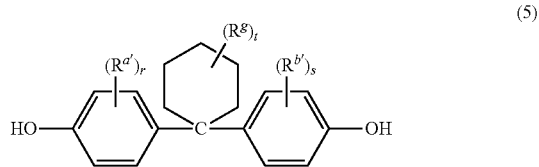

(5)

wherein $R^{a'}$ and $R^{b'}$ are each independently $C_1$-$C_{12}$ alkyl, $R^g$ is $C_1$-$C_{12}$ alkyl or halogen, r and s are each independently 1 to 4, and t is 0 to 10. $R^{a'}$ and $R^{b'}$ may be disposed meta to the cyclohexylidene bridging group. The substituents $R^{a'}$, $R^{b'}$ and $R^g$ may, when comprising an appropriate number of carbon atoms, be straight chain, cyclic, bicyclic, branched, saturated, or unsaturated. For example, $R^{a'}$, $R^{b'}$ and $R^g$ may be each independently $C_1$-$C_4$ alkyl, r and s are each 1, and t is 0 to 5. In another example, $R^{a'}$, $R^{b'}$ and $R^g$ may each be methyl, r and s are each 1, and t is 0 or 3. The cyclohexylidene-bridged bisphenol can be the reaction product of two moles of o-cresol with one mole of cyclohexanone. In another example, the cyclohexylidene-bridged bisphenol may be the reaction product of two moles of a cresol with one mole of a hydrogenated isophorone (e.g., 1,1,3-trimethyl-3-cyclohexane-5-one). Such cyclohexane-containing bisphenols, for example the reaction product of two moles of a phenol with one mole of a hydrogenated isophorone, are useful for making polycarbonate polymers with high glass transition temperatures and high heat distortion temperatures. Cyclohexyl bisphenol-containing polycarbonates, or a combination comprising at least one of the foregoing with other bisphenol polycarbonates, are supplied by Bayer Co. under the APEC® trade name.

$X^a$ may be a $C_1$-$C_{18}$ alkylene group, a $C_3$-$C_{18}$ cycloalkylene group, a fused $C_6$-$C_{18}$ cycloalkylene group, or a group of the formula —$B^1$—W—$B^2$— wherein $B^1$ and $B^2$ are the same or different $C_1$-$C_6$ alkylene group and W is a $C_3$-$C_{12}$ cycloalkylidene group or a $C_6$-$C_{16}$ arylene group.

In another example, $X^a$ may be a substituted $C_3$-$C_{18}$ cycloalkylidene of the formula (6):

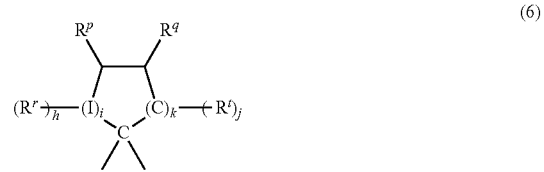

(6)

wherein $R^r$, $R^p$, $R^q$ and $R^t$ are each independently hydrogen, halogen, oxygen, or $C_1$-$C_{12}$ organic groups; I is a direct bond, a carbon, or a divalent oxygen, sulfur, or —N(Z)— where Z is hydrogen, halogen, hydroxy, $C_1$-$C_{12}$ alkyl, $C_1$-$C_{12}$ alkoxy, $C_6$-$C_{12}$ aryl, or $C_1$-$C_{12}$ acyl; h is 0 to 2, j is 1 or 2, i is an integer of 0 or 1, and k is an integer of 0 to 3, with the proviso that at least two of $R^r$, $R^p$, $R^q$ and $R^t$ taken together are a fused cycloaliphatic, aromatic, or heteroaromatic ring. It will be understood that where the fused ring is aromatic, the ring as shown in formula (6) will have an unsaturated carbon-carbon linkage where the ring is fused. When i is 0, h is 0, and k is 1, the ring as shown in formula (6) contains 4 carbon atoms; when i is 0, h is 0, and k is 2, the ring as shown contains 5 carbon atoms, and when i is 0, h is 0, and k is 3, the ring contains 6 carbon atoms. In one example, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone.

Other useful dihydroxy monomer units include aromatic dihydroxy compounds of formula (7):

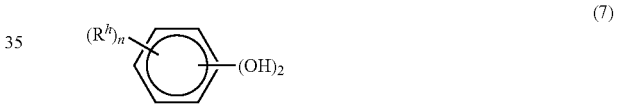

(7)

wherein each $R^h$ is independently a halogen atom, a $C_1$-$C_{10}$ hydrocarbyl such as a $C_1$-$C_{10}$ alkyl group, a halogen substituted $C_1$-$C_{10}$ hydrocarbyl such as a halogen-substituted $C_1$-$C_{10}$ alkyl group, and n is 0 to 4. The halogen, when present, is usually bromine.

Bisphenol-type dihydroxy aromatic compounds may include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxy-3-methylphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5- phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy aromatic compounds.

Examples of the types of bisphenol compounds represented by formula (3) may include 1,1-bis(4-hydroxyphenyl)methane, 1,1-bis(4-hydroxyphenyl)ethane, 2,2-bis(4-hydroxyphenyl)propane (also referred to as "bisphenol-A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine ("PPPBP"), 9,9-bis(4-hydroxyphenyl)fluorene, and 1,1-bis(4-hydroxy-3-methylphenyl)cyclohexane ("DMBPC"). Combinations comprising at least one of the foregoing dihydroxy aromatic compounds can also be used.

The dihydroxy compounds of formula (3) may be the following formula (8) for high heat applications:

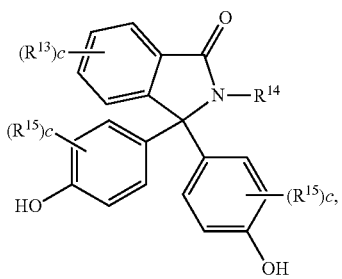

(8)

wherein $R^{13}$ and $R^{15}$ are each independently a halogen or a $C_1$-$C_6$ alkyl group, $R^{14}$ is a $C_1$-$C_6$ alkyl, phenyl, or phenyl substituted with up to five halogens or $C_1$-$C_6$ alkyl groups, and c is 0 to 4. In a specific embodiment, $R^{14}$ is a $C_1$-$C_6$ alkyl or phenyl group. In still another embodiment, $R^{14}$ is a methyl or phenyl group. In another specific embodiment, each c is 0.

The dihydroxy compounds of formula (3) may be the following formula (9) for high heat applications:

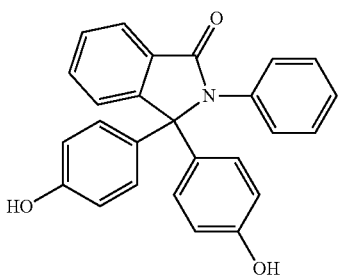

(9)

(also known as 3,3-bis(4-hydroxyphenyl)-2-phenylisoindolin-1-one (PPPBP)).

Alternatively, the dihydroxy compounds of formula (3) may be the following formula (10) for high heat applications:

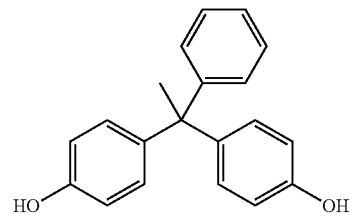

(10)

(also known as 4,4'-(1-phenylethane-1,1-diyl)diphenol (bisphenol-AP) or 1,1-bis(4-hydroxyphenyl)-1-phenylethane).

Alternatively, the dihydroxy compounds of formula (3) may be the following formula (11) for high heat applications:

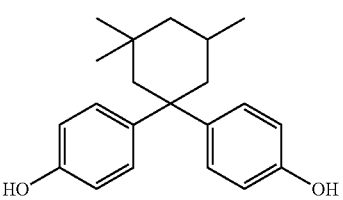

(11)

4,4'-(3,3,5-trimethylcyclohexane-1,1-diyl)diphenol (bisphenol TMC) or 1,1-bis(4-hydroxyphenyl)-3,3,5-trimethylcyclohexane).

Other dihydroxy compounds that might impart high Tgs to the polycarbonate as a copolycarbonate are dihydroxy compounds having adamantane units, as described in U.S. Pat. No. 7,112,644 and U.S. Pat. No. 3,516,968, which are fully incorporated herein by reference. A compound having adamantane units may have repetitive units of the following formula (12) for high heat applications:

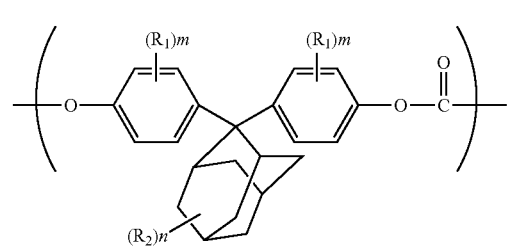

(12)

wherein $R_1$ represents a halogen atom, an alkyl group having 1 to 6 carbon atoms, an alkoxy group having 1 to 6 carbon atoms, an aryl group having 6 to 12 carbon atoms, an aryl-substituted alkenyl group having 7 to 13 carbon atoms, or a fluoroalkyl group having 1 to 6 carbon atoms; $R_2$ represents a halogen atom, an alkyl group having 1 to 12 carbon atoms, an alkoxy group having 1 to 12 carbon atoms, an aryl group having 6 to 12 carbon atoms, an aryl-substituted alkenyl group having 7 to 13 carbon atoms, or a fluoroalkyl group having 1 to 12 carbon atoms; m represents an integer of 0 to 4; and n represents an integer of 0 to 14.

Other dihydroxy compounds that might impart high Tgs to the polycarbonate as a copolycarbonate are dihydroxy compounds having fluorene-units, as described in U.S. Pat. No. 7,244,804. One such fluorene-unit containing dihydroxy compound is represented by the following formula (13) for high heat applications:

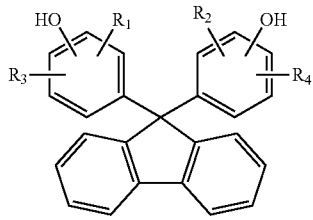

(13)

wherein $R_1$ to $R_4$ are each independently a hydrogen atom, a hydrocarbon group with 1 to 9 carbon atoms which may contain an aromatic group, or a halogen atom.

The repeating structural siloxane units of the polycarbonate-siloxane copolymers may have formula (14):

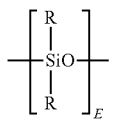

(14)

wherein each occurrence of R is the same or different, and is a $C_1$-$C_{13}$ monovalent organic group. For example, R can be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ aralkyl group, $C_7$-$C_{13}$ aralkoxy group, $C_7$-$C_{13}$ alkylaryl group, or $C_7$-$C_{13}$ alkylaryloxy group. The foregoing groups can be fully or partially halogenated with fluorine, chlorine, bromine, or iodine, or a combination thereof. In an embodiment, where a clear polycarbonate is desired, R does not contain any halogen. Combinations of the foregoing R groups can be used in the same polycarbonate.

The value of E in formula (14) can vary widely depending on the type and relative amount of each of the different units in the polycarbonate, the desired properties of the polycarbonate, and like considerations. Generally, E can have an average value of about 2 to about 1,000, specifically about 2 to about 500, more specifically about 2 to about 100. In an embodiment, E has an average value of about 4 to about 90, specifically about 5 to about 80, and more specifically about 10 to about 70. Where E is of a lower value, e.g., less than about 40, it can be desirable to use a relatively larger amount of the units containing the polysiloxane. Conversely, where E is of a higher value, e.g., greater than about 40, it can be desirable to use a relatively lower amount of the units containing the polysiloxane.

In one embodiment, the polysiloxane blocks are provided by repeating structural units of formula (15):

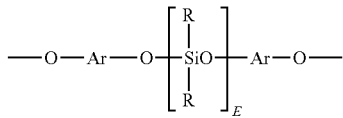

(15)

wherein E is as defined above; each R is the same or different, and is as defined above; and each Ar is the same or different, and Ar is one or more $C_6$-$C_{30}$ aromatic group(s), or one or more alkyl containing $C_6$-$C_{30}$ aromatic group(s), wherein the bonds are directly connected to an aromatic moiety. —O—Ar—O— groups in formula (15) can be derived from, for example, a $C_6$-$C_{30}$ dihydroxyaromatic compound. Combinations comprising at least one of the foregoing dihydroxyaromatic compounds can also be used. Exemplary dihydroxyaromatic compounds are 1,1-bis(4-hydroxyphenyl) methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulfide), 1,1-bis(4-hydroxy-3-methylphenyl)cyclohexane, and 1,1-bis(4-hydroxy-t-butylphenyl)propane, or a combination comprising at least one of the foregoing dihydroxy compounds.

Polycarbonate-siloxane copolymers comprising such units can be derived from the corresponding dihydroxy compound of formula (16):

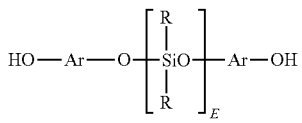

(16)

wherein Ar and E are as described above. Compounds of formula (16) can be obtained by the reaction of a dihydroxyaromatic compound with, for example, an alpha, omega-bis-acetoxy-polydiorganosiloxane oligomer under phase transfer conditions. Compounds of formula (16) can also be obtained from the condensation product of a dihydroxyaromatic compound, with, for example, an alpha, omega bis-chloro-polydimethylsiloxane oligomer in the presence of an acid scavenger.

In a specific embodiment, Ar from formula (16) is derived from resorcinol, and the polydiorganosiloxane repeating units are a dihydroxy aromatic compound of formula (17):

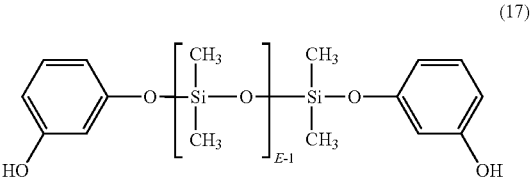

(17)

or, wherein Ar is derived from bisphenol-A, and the polydiorganosiloxane repeating units are a dihydroxy aromatic compound of formula (18):

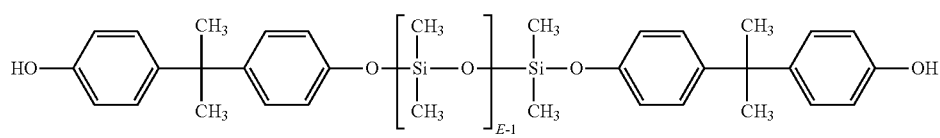

(18)

wherein E has an average value of between 20 and 75.

In another embodiment, polydiorganosiloxane blocks comprise units of formula (19):

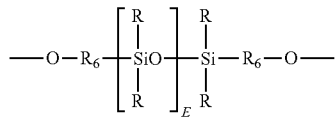
(19)

wherein R and E are as described above, and each $R_6$ is independently a divalent $C_1$-$C_{30}$ organic group such as a $C_1$-$C_{30}$ alkyl, $C_1$-$C_{30}$ aryl, or $C_1$-$C_{30}$ alkylaryl. The polysiloxane blocks corresponding to formula (19) are derived from the corresponding dihydroxy compound of formula (20):

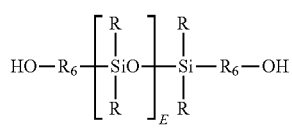
(20)

wherein R and E and $R_6$ are as described for formula (19).

In a specific embodiment, the polydiorganosiloxane blocks are derived from a polysiloxane monomer having the structure (21):

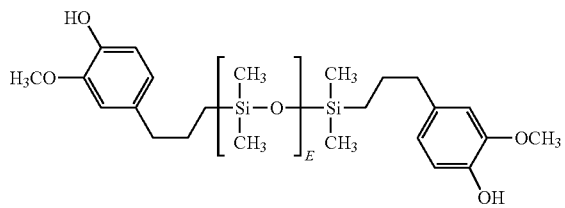
(21)

wherein E is an average value of between 20 and 75.

In another specific embodiment, the polydiorganosiloxane blocks are derived from a polysiloxane monomer having the structure (22):

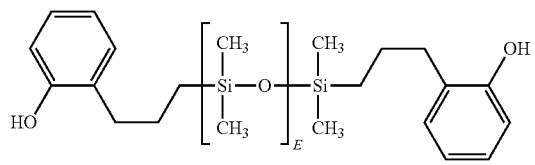
(22)

wherein E is an average value of between 20 and 75.

In a specific embodiment, the polydiorganosiloxane blocks are provided by repeating structural units of formula (23):

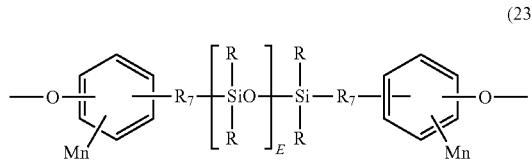
(23)

wherein R and E are as defined above. $R_7$ in formula (23) is a divalent $C_2$-$C_8$ aliphatic group. Each M in formula (31) can be the same or different, and is a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4.

In one embodiment, M of formula (23) is bromo or chloro, an alkyl group such as methyl, ethyl, or propyl, an alkoxy group such as methoxy, ethoxy, or propoxy, or an aryl group such as phenyl, chlorophenyl, or tolyl; n is 0 to 4; $R_7$ is a dimethylene, trimethylene or tetramethylene group; and R is a $C_1$-$C_8$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is one, $R_7$ is a divalent $C_1$-$C_3$ aliphatic group, and R is methyl.

Polycarbonate-siloxane copolymers comprising units of formula (23) can be derived from the corresponding dihydroxy polydiorganosiloxane (24):

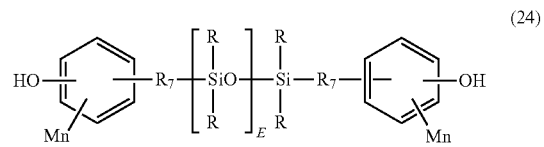
(24)

wherein each of R, E, M, $R_7$, and n are as described above. Such dihydroxy polysiloxanes can be made by affecting a platinum-catalyzed addition between a siloxane hydride of formula (25):

(25)

wherein R and E are as previously defined, and an aliphatically unsaturated monohydric phenol. Exemplary aliphatically unsaturated monohydric phenols include, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol, 4-allylphenol, and 2-allyl-4,6-dimethylphenol. Combinations comprising at least one of the foregoing can also be used.

Endcapping agents (also referred to as a chain-stopper) are used to limit molecular weight growth rate, and so control molecular weight. All types of polycarbonate end groups are contemplated as being useful in the polycarbonate-siloxane copolymers of the invention, provided that such end groups do not significantly adversely affect desired properties of the compositions.

Exemplary chain-stoppers include certain monophenolic compounds (i.e., phenyl compounds having a single free hydroxy group), monocarboxylic acid chlorides, monocarboxylic acids, and/or monochloroformates. Phenolic chain-stoppers are exemplified by phenol and $C_1$-$C_{22}$ alkyl-substituted phenols such as p-cumyl-phenol, resorcinol monobenzoate, and p-tertiary-butylphenol, cresol, and monoethers of diphenols, such as p-methoxyphenol. Exemplary chain-stoppers also include cyanophenols, such as for example, 4-cyanophenol, 3-cyanophenol, 2-cyanophenol, and polycyanophenols. Alkyl-substituted phenols with branched chain alkyl substituents having 8 to 9 carbon atoms can be specifically be used.

The polycarbonate-siloxane copolymers of the invention may include branching groups, provided that such branching does not significantly adversely affect desired properties of the polycarbonate-siloxane copolymer. Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl) phenol), 4-chloroformyl phthalic anhydride, trimesic acid, and benzophenone tetracarboxylic acid. The branching agents can be added at a level of about 0.05 to about 6.0 wt %. Mixtures comprising linear polycarbonates and branched polycarbonates can be used.

The polycarbonate-siloxane copolymers of the invention may be manufactured by processes such as interfacial polymerization. High Tg copolycarbonates are generally manufactured using interfacial polymerization. Although the reaction conditions for interfacial polymerization can vary, an exemplary process generally involves dissolving or dispersing one or more dihydric phenol reactants, such as bisphenol-A, in aqueous caustic soda or potash, adding the resulting mixture to a water-immiscible solvent medium, and contacting the reactants with a carbonate precursor in the presence of a catalyst such as, for example, a tertiary amine or a phase transfer catalyst, under controlled pH conditions, e.g., 8 to 11. The most commonly used water immiscible solvents include methylene chloride, 1,2-dichloroethane, chlorobenzene, toluene, and the like.

Exemplary carbonate precursors may include, for example, a carbonyl halide such as carbonyl dibromide or carbonyl dichloride (also known as phosgene), or a haloformate such as a bishaloformate of a dihydric phenol (e.g., the bischloroformate of bisphenol-A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In certain embodiments, the carbonate precursor is phosgene, a triphosgene, diacyl halide, dihaloformate, dicyanate, diester, diepoxy, diarylcarbonate, dianhydride, dicarboxylic acid, diacid chloride, or any combination thereof. An interfacial polymerization reaction to form carbonate linkages may use phosgene as a carbonate precursor, and is referred to as a phosgenation reaction.

Among tertiary amines that can be used are aliphatic tertiary amines such as triethylamine, tributylamine, cycloaliphatic amines such as N,N-diethyl-cyclohexylamine and aromatic tertiary amines such as N,N-dimethylaniline.

Among the phase transfer catalysts that can be used are catalysts of the formula $(R^{30})_4Q^+X$, wherein each $R^{30}$ is the same or different, and is a $C_1$-$C_{10}$ alkyl group; Q is a nitrogen or phosphorus atom; and X is a halogen atom, $C_1$-$C_8$ alkoxy group, or $C_6$-$C_{18}$ aryloxy group. Exemplary phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_1$-$C_8$ alkoxy group or a $C_6$-$C_{18}$ aryloxy group. An effective amount of a phase transfer catalyst can be 0.1 to 10 wt % based on the weight of bisphenol in the phosgenation mixture. For example, an effective amount of phase transfer catalyst can be 0.5 to 2 wt % based on the weight of bisphenol in the phosgenation mixture.

The compositions comprise at least one silicone-based graft copolymer.

The silicone-based graft copolymer may be present in the thermoplastic composition in an amount of about 0.5 wt % to about 15 wt %, based upon the total weight of the polycarbonate components in the composition. In certain embodiments, the silicone-based graft copolymer is present in the thermoplastic composition in an amount of about 0.5 wt %, about 1.0 wt %, about 1.5 wt %, about 2.0 wt %, about 2.5 wt %, about 3.0 wt %, about 3.5 wt %, about 4.0 wt %, about 4.5 wt %, about 5.0 wt %, about 5.5 wt %, about 6.0 wt %, about 6.5 wt %, about 7.0 wt %, about 7.5 wt %, about 8.0 wt %, about 8.5 wt %, about 9.0 wt %, about 9.5 wt %, about 10.0 wt %, about 10.5 wt %, about 11.0 wt %, about 11.5 wt %, about 12.0 wt %, about 12.5 wt %, about 13.0 wt %, about 13.5 wt %, about 14.0 wt %, about 14.5 wt %, or about 15.0 wt %, based on total weight of the polycarbonate in the composition. In certain embodiments, the silicone-based graft copolymer is present in the thermoplastic composition in an amount of about 0.5 wt %, about 0.6 wt %, about 0.7 wt %, about 0.8 wt %, about 0.9 wt %, about 1.0 wt %, about 1.1 wt %, about 1.2 wt %, about 1.3 wt %, about 1.4 wt %, about 1.5 wt %, about 1.6 wt %, about 1.7 wt %, about 1.8 wt %, about 1.9 wt %, or about 2.0 wt %, based upon the total weight of the polycarbonate in the composition. In certain embodiments, the silicone-based graft copolymer is present in the thermoplastic composition in an amount of 2.0 wt % or less, based upon the total weight of the polycarbonate in the composition. In certain embodiments, the silicone-based graft copolymer is present in the thermoplastic composition in an amount of 3.0 wt % or less, based upon the total weight of the polycarbonate in the composition. In certain embodiments, the silicone-based graft copolymer is present in the thermoplastic composition in an amount of 4.0 wt % or less, based upon the total weight of the polycarbonate components in the composition.

The silicone-based graft copolymer may be a silicone-based core-shell graft copolymer having a structure in which a vinyl monomer is grafted onto a silicone-based rubber core, thus forming a rigid shell. The silicone-based rubber core may be made of cyclosiloxane, examples of which may include hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrosiloxane, octaphenylcyclotetrasiloxane, and the like, and mixtures thereof. The vinyl monomer may be one or more compounds selected from the group consisting of styrene, α-methylstyrene, halogen or alkyl substituted styrene, acrylonitrile, methacrylonitrile, $C_1$-$C_8$ methacrylic acid alkylester, $C_1$-$C_8$ acrylic acid alkylester, maleic anhydride, and $C_1$-$C_4$ alkyl and phenyl N-substituted maleimide. The $C_1$-$C_8$ methacrylic acid alkylester and $C_1$-$C_8$ acrylic acid alkylester belong to esters of methacrylic acid and acrylic acid, respectively, which are esters derived from monohydric alcohol having 1 to 8 carbon atoms. Particular examples thereof may include methacrylic acid methyl ester, methacrylic acid ethyl ester and methacrylic acid propyl ester.

The rubber content of the silicone-based core-shell graft copolymer can be in the range of about 30% to about 90% by weight. The silicone content of the rubber core can be in the range of about 20% to about 100% by weight, or about 20% to about 95% by weight. In addition, the silicon content to a total silicone-based core-shell graft copolymer may be in the range of about 6% to about 85.5% by weight. For example, the silicon content to a total silicone-based core-shell graft copolymer may be in the range of about 50% to about 85% by weight in terms of flame retardance and impact strength.

The silicone-based rubber core component may be prepared by mixing the siloxane with one or more curing agents. Examples of suitable curing agents may include trimethoxymethylsilane, triethoxyphenylsilane, tetramethoxysilane, tetraethoxysilane, and the like, and mixtures thereof.

The silicone-based core-shell graft copolymer may be prepared by graft polymerization of the vinyl monomer onto the rubber core containing about 20% to about 100% by weight of silicon. Methods for preparing a graft copolymer in the form of a silicone-based core-shell are well-known in the art and will be readily understood by a person skilled in the art. In certain embodiments, the silicone-based core-shell graft copolymer is prepared by methods disclosed in U.S. Pat. No. 7,615,594, which is hereby incorporated by reference in its entirety. Additional description of the silicone-based core-shell graft copolymer is disclosed by Abele et al., "Silicone Based Flame Retardant for Polycarbonate," *ANTEC*, 2009, pp. 1351-1354.

In certain embodiments, the silicone-based core-shell graft copolymer is a silicone-based core-shell graft copolymer comprising more than 70 wt % of a silicone core component, the copolymer having a graft polymer component shell derived from mainly methacrylic ester monomer. In certain embodiments, the silicone-based core-shell graft copolymer is a silicone-based core-shell graft copolymer having a silicone content of 60% to 80% by weight, the copolymer having a graft polymer component shell derived from mainly methacrylic ester monomer. In certain embodiments, the silicone-based core-shell graft copolymer is a silicone-based core-shell graft copolymer having a silicone content of 60% to 70% by weight, the copolymer having a graft polymer component shell derived from mainly methacrylic ester monomer. In certain embodiments, the silicone-based core-shell graft copolymer is a silicone-based core-shell graft copolymer having a silicone content of 65% to 75% by weight, the copolymer having a graft polymer component shell derived from mainly methacrylic ester monomer. In certain embodiments, the silicone-based core-shell graft copolymer is a silicone-based core-shell graft copolymer having a silicone content of about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, or about 80% by weight, the copolymer having a graft polymer component shell derived from mainly methacrylic ester monomer. In certain embodiments, the graft polymer shell component is derived from methacrylic ester monomer. In certain embodiments, the silicone-based core-shell graft copolymer is a silicone-based core-shell graft copolymer sold under the tradename KANE ACE™ MR-01 by Kaneka Corporation (Japan).

The composition may include one or more additional polymers different from the polycarbonate-siloxane copolymer. In certain embodiments, the additional polymer is a homopolycarbonate, copolycarbonate, or combination thereof, formed from one or more carbonate units as described above.

In certain embodiments, the composition does not include aliphatic polyester-polycarbonate copolymers (e.g., isosorbide-based polyester-polycarbonate). Aliphatic polyester-polycarbonate copolymers may have an adverse effect on flame resistance and/or heat distortion temperature.

The polycarbonate(s) may be prepared as described above. Alternatively, the polycarbonate may be prepared by a melt polymerization process. Generally, in the melt polymerization process, polycarbonates are prepared by co-reacting, in a molten state, the dihydroxy reactant(s) (e.g., aliphatic diol and/or aliphatic diacid, and any additional dihydroxy compound) and a diaryl carbonate ester, such as diphenyl carbonate, or more specifically in an embodiment, an activated carbonate such as bis(methyl salicyl) carbonate, in the presence of a transesterification catalyst. The reaction may be carried out in typical polymerization equipment, such as one or more continuously stirred reactors (CSTR's), plug flow reactors, wire wetting fall polymerizers, free fall polymerizers, wiped film polymerizers, BANBURY® mixers, single or twin screw extruders, or combinations of the foregoing. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl)carbonate, bis(2-acetylphenyl)carboxylate, bis(4-acetylphenyl)carboxylate, or a combination comprising at least one of the foregoing.

The reactants for the polymerization reaction using an activated aromatic carbonate can be charged into a reactor either in the solid form or in the molten form. Initial charging of reactants into a reactor and subsequent mixing of these materials under reactive conditions for polymerization may be conducted in an inert gas atmosphere such as a nitrogen atmosphere. The charging of one or more reactants may also be done at a later stage of the polymerization reaction. Mixing of the reaction mixture is accomplished by any methods known in the art, such as by stirring. Reactive conditions include time, temperature, pressure and other factors that affect polymerization of the reactants. Typically the activated aromatic carbonate is added at a mole ratio of 0.8 to 1.3, and more preferably 0.9 to 1.3, and all sub-ranges there between, relative to the total moles of monomer unit compounds. In a specific embodiment, the molar ratio of activated aromatic carbonate to monomer unit compounds is 1.013 to 1.29, specifically 1.015 to 1.028.

In certain embodiments, the additional polycarbonate can include endgroups derived from the carbonyl source (i.e., the diaryl carbonate), from selection of monomer ratios, incomplete polymerization, chain scission, and the like, as well as any added endcapping groups, and can include derivatizable functional groups such as hydroxy groups, carboxylic acid groups, or the like. In an embodiment, the endgroup of a polycarbonate can comprise a structural unit derived from a diaryl carbonate, where the structural unit can be an endgroup. In a further embodiment, the endgroup is derived from an activated carbonate. Such endgroups can derive from the transesterification reaction of the alkyl ester of an appropriately substituted activated carbonate, with a hydroxy group at the end of a polycarbonate polymer chain, under conditions in which the hydroxy group reacts with the ester carbonyl from the activated carbonate, instead of with the carbonate carbonyl of the activated carbonate. In this way, structural units derived from ester containing compounds or substructures derived from the activated carbonate and present in the melt polymerization reaction can form ester endgroups. In an embodiment, the ester endgroup derived from a salicylic ester can be a residue of bis(methyl salicyl) carbonate (BMSC) or other substituted or unsubstituted bis(alkyl salicyl) carbonate such as bis(ethyl salicyl) carbonate, bis(propyl salicyl) carbonate, bis(phenyl salicyl) carbonate, bis(benzyl salicyl) carbonate, or the like. In a specific embodiment, where BMSC is used as the activated carbonyl source, the endgroup is derived from and is a residue of BMSC, and is an ester endgroup derived from a salicylic acid ester, having the structure of formula (26):

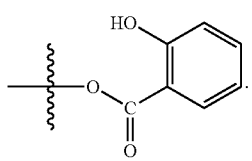
(26)

In certain embodiments, the additional polycarbonate is a cumyl phenol end capped 2,2-bis(4-hydroxyphenyl)propane polycarbonate. In certain embodiments, the polycarbonate is a low-flow cumyl phenol end capped 2,2-bis(4-hydroxyphenyl)propane polycarbonate that has a weight average molecular weight of 30,000 Daltons (referred to "PC-1"). In certain embodiments, the polycarbonate is a high-flow cumyl phenol end capped 2,2-bis(4-hydroxyphenyl)propane polycarbonate that has a weight average molecular weight of 22,000 Daltons. In certain embodiments, the polycarbonate is a cumyl phenol end capped 2,2-bis(4-hydroxyphenyl)propane polycarbonate that has a weight average molecular weight of 18,000 Daltons. In certain embodiments, the composition comprises a combination of the cumyl phenol end capped bisphenol-A polycarbonates.

The additional polycarbonate may be present in the thermoplastic composition in an amount of about 5 wt % to about 90 wt %, based upon the total weight of the polycarbonate components in the composition (e.g., polycarbonate-siloxane copolymer+BPA-polycarbonate). In certain embodiments, the additional polycarbonate is present in the thermoplastic composition in an amount of about 5 wt %, 10 wt %, about 15 wt %, about 20 wt %, about 25 wt %, about 30 wt %, about 35 wt %, about 40 wt %, about 45 wt %, about 50 wt %, about 55 wt %, about 60 wt %, about 65 wt %, about 70 wt %, about 75 wt %, about 80 wt %, about 85 wt %, or about 90 wt %, based upon the total weight of the polycarbonate components in the composition. In certain embodiments, the additional polycarbonate is present in the thermoplastic composition in an amount of 14 wt %, 17 wt %, 25 wt %, 28 wt %, 37.5 wt %, 45 wt %, 50 wt %, 65 wt %, or 75 wt %, based upon the total weight of the polycarbonate components in the composition.

The compositions may comprise additional components, such as one or more additives. Suitable additives include, but are not limited to impact modifiers, UV stabilizers, colorants, flame retardants, heat stabilizers, plasticizers, lubricants, mold release agents, fillers, reinforcing agents, antioxidant agents, antistatic agents, blowing agents, anti-drip agents, and radiation stabilizers. In an embodiment the additive is selected from impact modifiers, UV stabilizers, colorants, heat stabilizers, plasticizers, lubricants, mold release agents, fillers, reinforcing agents, antioxidant agents, antistatic agents, blowing agents, anti-drip agents, radiation stabilizers, and a combination comprising at least one of the foregoing.

The composition may comprise impact modifiers. For example, the composition can further include impact modifier(s), with the proviso that the additives are selected so as to not significantly adversely affect the desired properties (e.g., flame performance) of the composition. Suitable impact modifiers may be high molecular weight elastomeric materials derived from olefins, monovinyl aromatic monomers, acrylic and methacrylic acids and their ester derivatives, as well as conjugated dienes. The blend composition formed from conjugated dienes can be fully or partially hydrogenated. The elastomeric materials can be in the form of homopolymers or copolymers, including random, block, radial block, graft, and core-shell copolymers. Combinations of impact modifiers may be used.

A specific type of impact modifier may be an elastomer-modified graft copolymer comprising (i) an elastomeric (i.e., rubbery) polymer substrate having a Tg less than about 10° C., less than about 0° C., less than about −10° C., or between about −40° C. to −80° C., and (ii) a rigid polymer grafted to the elastomeric polymer substrate. Materials suitable for use as the elastomeric phase include, for example, conjugated diene rubbers, for example polybutadiene and polyisoprene; copolymers of a conjugated diene with less than about 50 wt % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_1$-$C_8$ alkyl(meth)acrylates; elastomeric copolymers of $C_1$-$C_8$ alkyl(meth)acrylates with butadiene and/or styrene; or combinations comprising at least one of the foregoing elastomers. Materials suitable for use as the rigid phase include, for example, monovinyl aromatic monomers such as styrene and alpha-methyl styrene, and monovinylic monomers such as acrylonitrile, acrylic acid, methacrylic acid, and the $C_1$-$C_6$ esters of acrylic acid and methacrylic acid, specifically methyl methacrylate.

Specific impact modifiers include styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN). Exemplary elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN).

MBS may be derived from the following monomers:

SEBS may be a linear triblock copolymer based on styrene and ethylene/butylene. Each copolymer chain may consist of three blocks: a middle block that is a random ethylene/butylene copolymer surrounded by two blocks of polystyrene. The SEBS may be styrene-b-(ethylene-co-butylene)-b-styrene polymer.

Impact modifiers may be present in amounts of 1 to 30 parts by weight, based on 100 parts by weight of the polymer component of the blend composition. Preferred impact modifiers may include MBS and SBS.

In certain embodiments, the composition comprises no additional impact modifiers beyond the silicone-based graft copolymer flame retardant as described above.

The composition may comprise a UV stabilizer for improved performance in UV stabilization. UV stabilizers disperse UV radiation energy.

UV stabilizers may be hydroxybenzophenones, hydroxyphenyl benzotriazoles, cyanoacrylates, oxanilides, and hydroxyphenyl triazines. UV stabilizers may include, but are not limited to, poly[(6-morphilino-s-triazine-2,4-diyl)[2,2,6,6-tetramethyl-4-piperidyl)imino]-hexamethylene[(2,2,6,6-tetramethyl-4-piperidyl)imino], 2-hydroxy-4-octyloxybenzophenone (Uvinul®3008), 6-tert-butyl-2-(5-chloro-2H-benzotriazole-2-yl)-4-methylphenyl (Uvinul® 3026), 2,4-di-tert-butyl-6-(5-chloro-2H-benzotriazole-2-yl)-phenol (Uvinul®3027), 2-(2H-benzotriazole-2-yl)-4,6-di-tert-pentylphenol (Uvinul®3028), 2-(2H-benzotriazole-2-yl)-4-(1,1,3,3-tetramethylbutyl)-phenol (Uvinul®3029), 1,3-bis[(2'-cyano-3',3'-diphenylacryloyl)oxy]-2,2-bis-{[(2'-cyano-3',3'-diphenylacryloyl)oxy]methyl}-propane (Uvinul® 3030), 2-(2H-benzotriazole-2-yl)-4-methylphenol (Uvinul®3033), 2-(2H-benzotriazole-2-yl)-4,6-bis(1-methyl-1-phenyethyl)phenol (Uvinul®3034), ethyl-2-cyano-3,3-diphenylacrylate (Uvinul® 3035), (2-ethylhexyl)-2-cyano-3,3-diphenylacrylate (Uvinul® 3039), N,N'-bisformyl-N,N'-bis(2,2,6,6-tetramethyl-4-piperidinyl)hexamethylendiamine (Uvinul® 4050H), bis-(2,2,6,6-tetramethyl-4-pipieridyl)-sebacate (Uvinul® 4077H), bis-(1,2,2,6,6-pentamethyl-4-piperdiyl)-sebacate+methyl-(1,2,2,6,6-pentamethyl-4-piperidyl)-sebacate (Uvinul® 4092H), 2-(2-Hydroxy-5-t-octylphenyl)benzotriazole (Cyasorb 5411), 2,2'-(1,4-Phenylene)bis[3,1-benzoxazin-4-one] (Cyasorb UV-3638), 2-(2H-Benzotriazol-2-yl)-4,6-bis(1-methyl-1-phenylethyl)phenol (Tinuvin 234), and combinations thereof.

The composition may comprise one or more UV stabilizers, including Cyasorb 5411, Cyasorb UV-3638, Uvinul 3030, and/or Tinuvin 234.

The composition may comprise colorants such as pigment and/or dye additives. Useful pigments may include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments. Pigments are generally used in amounts of 0.01 to 10 parts by weight, based on 100 parts by weight of the polymer component of the blend composition.

Exemplary dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly($C_2$-$C_8$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3"",5""-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes. Dyes are generally used in amounts of 0.01 to 10 parts by weight, based on 100 parts by weight of the polymer component of the blend composition.

The composition may comprise flame retardants. Various types of flame retardants can be utilized as additives. In one embodiment, the flame retardant additives include, for example, flame retardant salts such as alkali metal salts of perfluorinated $C_1$-$C_{16}$ alkyl sulfonates such as potassium perfluorobutane sulfonate (KPFS), potassium perfluoroctane sulfonate, tetraethylammonium perfluorohexane sulfonate, potassium diphenylsulfone sulfonate (KSS), and the like, sodium benzene sulfonate, sodium toluene sulfonate (NATS) and the like; and salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. KPFS and KSS and NATS, alone or in combination with other flame retardants, are particularly useful in the compositions disclosed herein.

The flame retardants may be selected from at least one of the following: alkali metal salts of perfluorinated $C_1$-$C_{16}$ alkyl sulfonates; potassium perfluorobutane sulfonate; potassium perfluoroctane sulfonate; tetraethylammonium perfluorohexane sulfonate; and potassium diphenylsulfone sulfonate.

The flame retardant additives may include organic compounds that include bromine, and/or chlorine.

In certain embodiments, the flame retardant is not a bromine or chlorine containing composition.

The flame retardant additive may have formula (27):

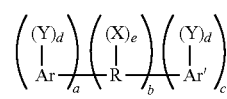

(27)

wherein R is a $C_1$-$C_{36}$ alkylene, alkylidene or cycloaliphatic linkage, e.g., methylene, ethylene, propylene, isopropylene, isopropylidene, butylene, isobutylene, amylene, cyclohexylene, cyclopentylidene, or the like; or an oxygen ether, carbonyl, amine, or a sulfur-containing linkage, e.g., sulfide, sulfoxide, sulfone, or the like. R can also consist of two or more alkylene or alkylidene linkages connected by such groups as aromatic, amino, ether, carbonyl, sulfide, sulfoxide, sulfone, or the like.

Ar and Ar' in formula (27) are each independently mono- or polycarbocyclic aromatic groups such as phenylene, biphenylene, terphenylene, naphthylene, or the like.

Y is an organic, inorganic, or organometallic radical, for example halogen, e.g., chlorine, bromine, iodine, fluorine; ether groups of the general formula OB, wherein B is a monovalent hydrocarbon group similar to X; monovalent hydrocarbon groups of the type represented by R; or other substituents, e.g., nitro, cyano, and the like, said substituents being essentially inert provided that there is greater than or equal to one, specifically greater than or equal to two, halogen atoms per aryl nucleus. One or both of Ar and Ar' may further have one or more hydroxyl substituents.

When present, each X is independently a monovalent hydrocarbon group, for example an alkyl group such as methyl, ethyl, propyl, isopropyl, butyl, decyl, or the like; an aryl group such as phenyl, naphthyl, biphenyl, xylyl, tolyl, or the like; an aralkyl group such as benzyl, ethylphenyl, or the like; or a cycloaliphatic group such as cyclopentyl, cyclohexyl, or the like. The monovalent hydrocarbon group can itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c can be 0. Otherwise either a or c, but not both, can be 0. Where b is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of polymeric or oligomeric flame retardants derived from mono or dihydroxy derivatives of formula (27) are: 2,2-bis-(3,5-dichlorophenyl)-propane; bis-(2-chlorophenyl)-methane; bis(2,6-dibromophenyl)-methane; 1,1-bis-(4-iodophenyl)-ethane; 1,2-bis-(2,6-dichlorophenyl)-ethane; 1,1-bis-(2-chloro-4-iodophenyl) ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenylmethane; bis-(3,5-dichlorophenyl)-cyclohexylmethane; bis-(3-nitro-4-bromophenyl)-methane; bis-(4-hydroxy-2,6-dichloro-3-methoxyphenyl)-methane; 2,2-bis-(3,5-dichloro-4-hydroxyphenyl)-propane; and 2,2-bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Another useful class of flame retardant is the class of cyclic siloxanes having the general formula [(R)$_2$SiO]y wherein R is a monovalent hydrocarbon or fluorinated hydrocarbon having from 1 to 18 carbon atoms and y is a number from 3 to 12. Examples of fluorinated hydrocarbon include, but are not limited to, 3-fluoropropyl, 3,3,3-trifluoropropyl, 5,5,5,4,4,3,3-heptafluoropentyl, fluorophenyl, difluorophenyl and trifluorotolyl. Examples of suitable cyclic siloxanes include, but are not limited to, octamethylcyclotetrasiloxane, 1,2,3,4-tetramethyl-1,2,3,4-tetravinylcyclotetrasiloxane, 1,2,3,4-tetramethyl-1,2,3,4-tetraphenylcyclotetrasiloxane, octaethylcyclotetrasiloxane, octapropylcyclotetrasiloxane, octabutylcyclotetrasiloxane, decamethylcyclopentasiloxane, dodecamethylcyclohexasiloxane, tetradecamethylcycloheptasiloxane, hexadecamethylcyclooctasiloxane, eicosamethylcyclodecasiloxane, octaphenylcyclotetrasiloxane, and the like. A particularly useful cyclic siloxane is octaphenylcyclotetrasiloxane.

Flame retardant additives are generally present in amounts of 0.01 to 10 wt %, more specifically 0.02 to 5 wt %, based on 100 parts by weight of the polymer component of the thermoplastic composition.

In certain embodiments, the flame retardant additive is potassium perfluorobutane sulfonate (KPFS), and is present in an amount of about 0.07 wt % to about 0.09 wt %, based on 100 parts by weight of the polymer component of the thermoplastic composition. In certain embodiments, the flame retardant additive is potassium perfluorobutane sulfonate, and is present in an amount of 0.07 wt %, 0.080 wt %, or 0.09 wt %, based on 100 parts by weight of the polymer component of the thermoplastic composition.

In certain embodiments, the flame retardant additive is potassium diphenylsulfone sulfonate (KSS), and is present in an amount of about 0.25 wt % to about 0.35 wt %, based on 100 parts by weight of the polymer component of the thermoplastic composition. In certain embodiments, the flame retardant additive is potassium diphenylsulfone sulfonate (KSS), and is present in an amount of 0.25 wt %, 0.26 wt %, 0.27 wt %, 0.28 wt %, 0.29 wt %, 0.30 wt %, 0.31 wt %, 0.32 wt %, 0.33 wt %, 0.34 wt %, or 0.35 wt %, based on 100 parts by weight of the polymer component of the thermoplastic composition.

In certain embodiments, the compositions disclosed herein do not include a phosphorous containing compound. In certain embodiments, the compositions disclosed herein do not include a phosphorus containing flame retardant, such as, for example, bis-phenol A diphenyl phosphonate (BPADP). Phosphorus containing flame retardants may adversely affect impact resistance and/or heat distortion temperature.

The composition may comprise heat stabilizers. Exemplary heat stabilizer additives include, for example, organophosphites such as triphenyl phosphite, tris-(2,6-dimethylphenyl)phosphite, tris-(mixed mono- and di-nonylphenyl) phosphite, tris(2,4-di-tert-butylphenyl)phosphite (Irgafos 168), or the like; phosphonates such as dimethylbenzene phosphonate or the like; phosphates such as trimethyl phosphate, or the like; or combinations comprising at least one of the foregoing heat stabilizers. Heat stabilizers are generally used in amounts of 0.0001 to 1 part by weight, based on 100 parts by weight of the polymer component of the blend composition.

The composition may comprise plasticizers, lubricants, and mold release agents. Mold release agent (MRA) will allow the material to be removed quickly and effectively. Mold releases can reduce cycle times, defects, and browning of finished product. There is considerable overlap among these types of materials, which may include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl)phosphate of hydroquinone and the bis(diphenyl)phosphate of bisphenol-A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate (PETS), and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like. Such materials are generally used in amounts of 0.001 to 1 part by weight, specifically 0.01 to 0.75 part by weight, more specifically 0.1 to 0.5 part by weight, based on 100 parts by weight of the polymer component of the blend composition.

The composition may comprise other fillers or reinforcing agents. Possible fillers or reinforcing agents include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

The fillers and reinforcing agents can be coated with a layer of metallic material to facilitate conductivity, or surface treated with silanes to improve adhesion and dispersion with the polymeric matrix. In addition, the reinforcing fillers can be provided in the form of monofilament or multifilament fibers and can be used individually or in combination with other types of fiber, through, for example, co-weaving or core/sheath, side-by-side, orange-type or matrix and fibril constructions, or by other methods known to one skilled in the art of fiber manufacture. Exemplary co-woven structures include, for example, glass fiber-carbon fiber, carbon fiber-aromatic polyimide (aramid) fiber, and aromatic polyimide fiberglass fiber or the like. Fibrous fillers can be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. Fillers are generally used in amounts of 0 to 80 parts by weight, based on 100 parts by weight of the polymer component of the blend composition.

The composition may comprise an antioxidant additive. Exemplary antioxidant additives include, for example, organophosphites such as tris(nonyl phenyl)phosphite, tris(2,4-di-t-butylphenyl)phosphite ("IRGAFOS 168" or "I-168"), bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate or the like; amides of beta-(3,5-di-tert-butyl-4-hydroxyphenyl)-propionic acid or the like, or combinations comprising at least one of the foregoing antioxidants. Antioxidants are generally used in amounts of 0.0001 to 1 part by weight, based on 100 parts by weight of the polymer component of the blend composition.

The composition may comprise an antistatic agent. Examples of monomeric antistatic agents may include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents may include certain polyesteramides polyether-polyamide (polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example PELESTAT® 6321 (Sanyo) or PEBAX® MH1657 (Atofina), IRGASTAT® P18 and P22 (Ciba-Geigy). Other polymeric materials may be used as antistatic agents are inherently conducting polymers such as polyaniline (commercially available as PANIPOL®EB from Panipol), polypyrrole and polythiophene (commercially available from Bayer), which retain some of their intrinsic conductivity after melt processing at elevated temperatures. Carbon fibers, carbon nanofibers, carbon nanotubes, carbon black, or a combination comprising at least one of the foregoing may be used in a polymeric containing chemical antistatic agents to render the composition electrostatically dissipative. Antistatic agents are generally used in amounts of 0.0001 to 5 parts by weight, based on 100 parts by weight of the polymer component of the blend composition.

The composition may comprise a blowing agent. Foam may be a useful blowing agent. Low boiling halohydrocarbons and those that generate carbon dioxide may be used as blowing agents. Blowing agents may be used that are solid at room temperature and when heated to temperatures higher than their decomposition temperature, generate gases such as nitrogen, and carbon dioxide, such as azodicarbonamide, metal salts of azodicarbonamide, 4,4' oxybis(benzenesulfonylhydrazide), dihydrooxadiazinones such as 5-phenyl-3,6-dihydro-1,3,4-oxadiazin-2-one (PDOX), sodium bicarbonate, ammonium carbonate, or the like, or combinations comprising at least one of the foregoing blowing agents. Blowing agents may be used in amounts of 0.01 to 20 parts by weight, based on 100 parts by weight of the polymer component of the blend composition.

The composition may comprise anti-drip agents. The anti-drip agent may be a fibril forming fluoropolymer such as polytetrafluoroethylene (PTFE). The anti-drip agent can be encapsulated by a rigid copolymer as described above, for example styrene-acrylonitrile copolymer (SAN). PTFE encapsulated in SAN is known as TSAN. Encapsulated fluoropolymers can be made by polymerizing the encapsulating polymer in the presence of the fluoropolymer, for example an aqueous dispersion. TSAN can provide significant advantages over PTFE, in that TSAN can be more readily dispersed in the composition. An exemplary TSAN can comprise 50 wt % PTFE and 50 wt % SAN, based on the total weight of the encapsulated fluoropolymer. The SAN can comprise, for example, 75 wt % styrene and 25 wt % acrylonitrile based on the total weight of the copolymer. Alternatively, the fluoropolymer can be pre-blended in some manner with a second polymer, such as for, example, an aromatic polycarbonate or SAN to form an agglomerated material for use as an anti-drip agent. Either method can be used to produce an encapsulated fluoropolymer. Antidrip agents are generally used in amounts of 0.1 to 5 percent by weight, based on 100 parts by weight of the polymer component of the blend composition.

In certain embodiments, the anti-drip agent is fibril forming polytetrafluoroethylene (PTFE). The fibril forming PTFE may be present in an amount of about 0.3 wt % to about 0.5 wt %, based on 100 parts by weight of the polymer component of the blend composition. In certain embodiments, the fibril forming PTFE may be present in an amount of 0.3 wt %, 0.4 wt %, or 0.5 wt %, based on 100 parts by weight of the polymer component of the blend composition.

In certain embodiments, the anti-drip agent is TSAN. The TSAN may be present in an amount of about 0.3 wt % to about 0.5 wt %, based on 100 parts by weight of the polymer component of the blend composition. In certain embodiments, the TSAN is present in an amount of 0.3 wt %, 0.40 wt %, or 0.5 wt %, based on 100 parts by weight of the polymer component of the blend composition.

The compositions disclosed herein can be manufactured by various methods. For example, a composition may be first mixed in a high speed HENSCHEL-Mixer®. Other low shear processes, including but not limited to hand mixing, can also accomplish this blending. The mixed composition may then be fed into the throat of a single or twin-screw extruder via a hopper. Alternatively, at least one of the components can be incorporated into the composition by feeding directly into the extruder at the throat and/or downstream through a side-stuffer. Additives can also be compounded into a masterbatch with a desired polymeric and fed into the extruder. The extruder may be generally operated at a temperature higher than that necessary to cause the composition to flow. The extrudate may be immediately quenched in a water batch and pelletized. The pellets, so prepared, when cutting the extrudate can be one-fourth inch long or less as desired. Such pellets can be used for subsequent molding, shaping, or forming.

Compositions disclosed herein may be formed, shaped, molded, injection molded, or extruded into an article. The compositions can be molded into useful shaped articles by a variety of means such as injection molding, overmolding, co-injection molding, extrusion, multilayer extrusion, rotational molding, blow molding and thermoforming to form articles.

Articles that may be formed from the compositions include various components for cell phones and cell phone covers, components for computer housings, computer housings and business machine housings and parts such as housings and parts for monitors, computer routers, copiers, desk top printers, large office/industrial printers handheld electronic device housings such as computer or business machine housings, housings for hand-held devices, components for light fixtures or home or office appliances, humidifier housings, thermostat control housings air conditioner drain pans, outdoor cabinets, telecom enclosures and infrastructure, Simple Network Intrusion Detection System (SNIDS) devices, network interface devices, smoke detectors, components and devices in plenum spaces, components for medical applications or devices such as medical scanners, X-ray equipment, and ultrasound devices, components for interior or exterior components of an automobile, greenhouse components, sun room components, fire helmets, safety shields, fenders, gas pumps, films for televisions, such as ecofriendly films having no halogen content, solar application materials, glass lamination materials, fibers for glassed filled systems, turbine blades (e.g., wind turbines), and the like.

In certain embodiments, articles that may comprise the composition include automotive bumpers, other automotive, construction and agricultural equipment exterior components, automobile mirror housings, automobile wheel covers, automobile, construction and agricultural equipment instrument panels and trim, automobile glove boxes, automobile door hardware and other interior trim, automobile construction and agricultural equipment exterior lights, automobile parts within the engine compartment, plumbing equipment, valves and pumps, air conditioning heating and cooling parts, furnace and heat pump parts, computer parts, electronics parts, projector parts, electronic display parts, copier parts, scanner parts, electronic printer toner cartridges, hair driers, irons, coffee makers, toasters, washing machines, microwave ovens, ovens, power tools, electric components, lighting parts, dental instruments and equipment, medical instruments, cookware, medical instrument trays, animal cages, fibers, and laser welded medical devices.

In certain embodiments, articles that may comprise the composition include automotive bumpers, other automotive exterior components, automobile mirror housings, automobile wheel covers, automobile instrument panels and trim, automobile glove boxes, automobile door hardware and other interior trim, external automobile trim parts, such as pillars, automobile exterior lights, automobile parts within the engine compartment, an agricultural tractor or device part, a construction equipment vehicle or device part, a marine or personal water craft part, an all-terrain vehicle or all-terrain vehicle part, plumbing equipment, valves and pumps, air conditioning heating and cooling parts, furnace and heat pump parts, computer parts, electronics parts, projector parts, electronic display parts, copier parts, scanner parts, electronic printer toner cartridges, hair driers, irons, coffee makers, toasters, washing machines, microwave ovens, ovens, power tools, electric components, electric enclosures, lighting parts, dental instruments, medical instruments, medical or dental lighting parts, an aircraft part, a train or rail part, a seating component, sidewalls, ceiling parts, cookware, medical instrument trays, animal cages, fibers, laser welded medical devices, cell phone parts, greenhouse components, sun room components, fire helmets, safety shields, gas pump parts, and turbine blades.

In certain embodiments, the article is one that requires or must include a material having a UL94 V0 rating performance. Articles that require a UL94 V0 rating include, but are not limited to, computer housings, computer housings and business machine housings and parts such as housings and parts for monitors, computer routers, copiers, desk top printers, large office/industrial printers, handheld electronic device housings such as computer or business machine housings, housings for hand-held devices, components for light fixtures including LED fixtures or home or office appliances, humidifier housings, thermostat control housings, air conditioner drain pans, outdoor cabinets, telecom enclosures and infrastructure, Simple Network Intrusion Detection System (SNIDS) devices, network interface devices, smoke detectors, components and devices in plenum spaces, components for medical applications or devices such as medical scanners, X-ray equipment, and ultrasound devices, electrical boxes and enclosures, and electrical connectors.

In certain embodiments, the article is one that requires a combination of flame resistance, and/or impact resistance. For example, in certain embodiments the article may be a safety shield, a gas/fuel pump housing, or the like.

The article may be produced by a manufacturing process. The process may comprise the steps of (a) providing a composition as described above; (b) melting the composition, for example, at 200-400° C., 225-350° C., 250-310° C., or 270-300° C. in an extruder; (c) extruding the composition; and (d) isolating the composition. The article of manufacture may further be produced by the step of (e) drying the composition and (f) melt forming the composition.

The present invention has multiple aspects, illustrated by the following non-limiting examples.

EXAMPLES

Melt volume flow rate tests (MVR) were conducted using ASTM D 1238-10 at 1.2 kg at 300° C. Testing was conducted with the usual 360 sec warming time (dwell) and with 1080 sec dwell to assess the stability of the samples.

Notched Izod measurements were conducted according to the method of ASTM D 256-04 on test bars that measured 0.125 inch thickness by 0.5 inch wide and 2.5 inch long at room temperature (23° C.) and low temperature (0° C. to −40° C.).

Tensile testing was conducted according to the method of D638-10. Flexural testing was conducted according to the method of ASTM D648-07. Distortion Temperature Under Load (DTUL) testing was conducted according to the method of ASTM D790-10.

Flammability of parts were tested using the standard Underwriters Laboratory UL 94 V0 test method (2 day conditioning method), except that 20 bars are tested. In the standard UL 94 procedure 5 bars are first tested, and if the sample fails, a second 5 bar re-test is allowed. To conduct a V0 test, a specimen is supported in a vertical position and a flame is applied to the bottom of the specimen. The flame is applied for ten seconds and then removed until flaming stops at which time the flame is reapplied for another ten seconds and then removed. To achieve a V0 rating, specimens must not burn with flaming combustion for more than 10 seconds after either test flame application. Total flaming combustion time must not exceed 50 seconds for each set of 5 specimens. Specimens must not burn with flaming or glowing combustion up to the specimen holding clamp. Specimens must not drip flaming particles that ignite the cotton used according to the UL 94 V0 test method. No specimen can have glowing combustion remain for longer than 30 seconds after removal of the test flame.

The flammability data was analyzed first by calculation of the average flame out time, standard deviation of the flame out time and noting any specific bar failures due to flaming drips, and using statistical methods to convert that data to a prediction of the probability of first time pass, or "p(FTP)" that a particular sample formulation would achieve a V0 "pass" rating in the conventional UL94 testing of 5 bars. Preferably, p(FTP) will be as close to 1 as possible for maximum flame-retardant performance in UL Testing. For example, a p(FTP) V0 of 0.9000 indicates that the sample is predicted to have a 90% probability of passing V0 on the first five bar test by the usual UL procedure. A p(FTP) value of 0.85 or greater may correlate to a UL94 V0 "pass," or a UL94 V0 rating.

Molecular weight determinations were performed using gel permeation chromatography (GPC), using a cross-linked styrene-divinylbenzene column and calibrated to bisphenol-A polycarbonate standards using a UV-VIS detector set at 264 nm. Samples were prepared at a concentration of about 1 mg/ml, and eluted at a flow rate of about 1.0 ml/min.

Table 1 summarizes constituents of exemplary compositions of the invention. PC-siloxane-1 and PC-siloxane-2 of Table 1 were prepared by methods described in U.S. Pat. Nos. 6,870,013, 6,723,864 and 6,833,422, which are hereby incorporated by reference in their entirety. PC-siloxane-3 was prepared by the method of U.S. Pat. No. 6,072,011, which is herein incorporated by reference. All formulations were prepared by dry blending, and extruded with a Werner Pfleiderer 30 mm twin screw at a temperature profile of 520° F. to 550° F. The blended formulations were cut into pellets and injection molded at 540° F. to 580° F.

TABLE 1

| Component | Description | Source |
| --- | --- | --- |
| PC-siloxane-1 | Polycarbonate-siloxane copolymer*, containing 6 wt % siloxane (Mw = 23,000 Daltons, PC standards) | SABIC-IP |
| PC-siloxane-2 | Polycarbonate-siloxane copolymer*, containing 6 wt % siloxane (Mw = 18,300 Daltons, PC standards) | SABIC-IP |

TABLE 1-continued

| Component | Description | Source |
|---|---|---|
| PC-siloxane-3 | Polycarbonate-siloxane copolymer*, containing 20 wt % siloxane (Mw = 30,000 Daltons, PC standards) | SABIC-IP |
| PC-1 | 2,2-bis(4-hydroxyphenyl)propane polycarbonate with cumyl phenol endcap (Mw = 30,000 Daltons, PC standards) | SABIC-IP |
| PC-2 | 2,2-bis(4-hydroxyphenyl)propane polycarbonate with cumyl phenol endcap (Mw = 22,000 Daltons, PC standards) | SABIC-IP |
| PC-3 | 2,2-bis(4-hydroxyphenyl)propane polycarbonate with cumyl phenol endcap (Mw = 18,000 Daltons, PC standards) | SABIC-IP |
| MR-01 | Silicone-based graft copolymer, containing more than 70 wt % of a silicone core component with a graft polymer component shell derived from mainly methacrylic ester monomer ("silicone core shell additive") | Kaneka Corp. |
| KSS | Potassium diphenylsulphon-3-sulphonate | Arichem LLC |
| KPFS | Potassium perfluorobutanesulfonate | Lanxess |
| NaTS | Sodium toluene sulfonate | |
| Component | Description | Source |
| TSAN | A drip retardant encapsulated polytetrafluoroethylene, comprising 50 wt % polystyrene acrylonitrile and 50 wt % polytetrafluoroethylene. | SABIC-IP |
| PETS | Pentaerythritol tetrastearate | Faci |
| $TiO_2$ | Titanium Dioxide | |

*The Polycarbonate-siloxane copolymer is derived from: bisphenol-A, the siloxane monomer of structure (21) wherein E is an average value of 45, and p-cumylphenol endcap.

Table 2 shows the results of flame resistance testing of MR-01 in three compositions: PC BPA-homopolymer, PC-siloxane-1 based blend, and PC-siloxane-3 based blend, with and without added flame retardant salts. The levels of MR-01 and the flame retardant salts were selected as being found to be optimal respectively by the vendor of MR-01 and by prior SABIC studies with the flame retardant salts. The UL 94 testing at 1.2 and 1.0 mm was selected, as mentioned above, due to the commercial need for formulations that pass this testing at less than 1.5 mm. Current commercial grades are UL 94 V0 at 1.5 mm.

The p(FTP) results in the table indicate a strong favorable interaction between PC-siloxane copolymers and the MR-01 additive. At 1.2 mm testing, MR-01 had negligible effect on the UL 94 performance of PC homopolymer, alone or with FR salts. In contrast, for both PC-siloxane copolymer containing resins, the MR-01 substantially enhanced UL 94 performance. Compare lots 6 and 7 at both 1.2 and 1.0 mm, and lots 11 and 12 at 1.2 mm for the benefit of MR-01 in PC-siloxane. Compare lots 12 and 14 at 1.2 mm for the benefit of added flame retardant salt to PC-siloxane/MR-01. Also compare lots 12, 13 and 15 at 1.0 mm for the benefits of added flame retardant salt. The effect of the flame retardant salt on the UL 94 performance appears to be specific to particular combinations on type of flame retardant salt and thickness.

TABLE 2

| | PC homopolymer based | | | | | PC-siloxane-1 based, 3.5 wt % siloxane* | | |
|---|---|---|---|---|---|---|---|---|
| | lot # | | | | | | | |
| | 1 | 2 | 3 | 4 | 5 | 6 | 7 | 8 |
| PC siloxane-1 | | | | | | 58 | 58 | 58 |
| PC siloxane-3 | | | | | | | | |
| PC-1 | 65.00 | 65.00 | 65.00 | 65.00 | 65.00 | 28.00 | 28.00 | 28.00 |
| PC-2 | 35.00 | 35.00 | 35.00 | 35.00 | 35.00 | 14.00 | 14.00 | 14.00 |
| MR-01 | | 3.00 | 3.00 | 3.00 | 3.00 | | 3.00 | 3.00 |
| KSS | | | 0.30 | | | | | 0.30 |
| KPFS | | | | 0.080 | | | | |
| NaTS | | | | | 0.100 | | | |
| TSAN | 0.40 | 0.40 | 0.40 | 0.40 | 0.40 | 0.40 | 0.40 | 0.40 |
| MVR | | | | | | | | |
| Dwell, sec | 360 | 360 | 360 | 360 | 360 | 360 | 360 | 360 |
| $cm^3$/10 min | 10.2 | 7.65 | 7.94 | 7.93 | 7.93 | 9.25 | 8.48 | 9.06 |
| Dwell, sec | 1080 | 1080 | 1080 | 1080 | 1080 | 1080 | 1080 | 1080 |
| $cm^3$/10 min | 11 | 8.54 | 7.67 | 8.63 | 8.37 | 9.78 | 9.25 | 9.01 |
| UL 94 V0 | | | | | | | | |
| p(FTP) 1.2 mm | 0.00 | 0.134 | 0.333 | 0.011 | 0.000 | 0.673 | 0.984 | 0.694 |
| p(FTP) 1.0 mm | | | | | | 0.045 | 0.750 | 0.298 |

TABLE 2-continued

| | PC-siloxane-1 based, 3.5 wt % siloxane* | | PC-siloxane-3 based, 3.5 wt % siloxane* | | | | |
|---|---|---|---|---|---|---|---|
| | lot # | | | | | | |
| | 9 | 10 | 11 | 12 | 13 | 14 | 15 |
| PC siloxane-1 | 58 | 58 | | | | | |
| PC siloxane-3 | | | 17.50 | 17.50 | 17.50 | 17.50 | 17.50 |
| PC-1 | 28.00 | 28.00 | 37.50 | 37.50 | 37.50 | 37.50 | 37.50 |
| PC-2 | 14.00 | 14.00 | 45.00 | 45.00 | 45.00 | 45.00 | 45.00 |
| MR-01 | 3.00 | 3.00 | | 3.00 | 3.00 | 3.00 | 3.00 |
| KSS | | | | | 0.30 | | |
| KPFS | 0.080 | | | | | 0.080 | |
| NaTS | | 0.100 | | | | | 0.100 |
| TSAN | 0.40 | 0.40 | 0.40 | 0.40 | 0.40 | 0.40 | 0.40 |
| MVR | | | | | | | |
| Dwell, sec | 360 | 360 | 360 | 360 | 360 | 360 | 360 |
| cm³/10 min | 8.32 | 8.18 | 9.04 | 7.86 | 7.74 | 7.75 | 8.14 |
| Dwell, sec | 1080 | 1080 | 1080 | 1080 | 1080 | 1080 | 1080 |
| cm³/10 min | 9.18 | 8.62 | 9.94 | 9.24 | 8.34 | 9.03 | 8.54 |
| UL 94 V0 | | | | | | | |
| p(FTP) 1.2 mm | 0.982 | 0.239 | 0.8598 | 0.943 | 0.874 | 0.978 | 0.265 |
| p(FTP) 1.0 mm | 0.175 | 0.478 | 0.082 | 0.057 | 0.403 | 0.007 | 0.568 |

*Siloxane wt % is based on total weight of the polycarbonate components

Table 3 shows the results of impact testing MR-01 in the three compositions. The MR-01 actually improves impact performance of these resins, as is evident in % ductility at −20° C. for PC homopolymer (lots 1 and 2) and at −30° C. and −40° C. for PC-siloxane-1 based blend (lots 6 and 7) at −30° C. and −40° C. Due to the usual better impact performance of PC-siloxane-3 based compositions, no ductility failures were seen in this testing for either the reference without MR-01 or the experimental sample.

Overall results show that the MR-01 additive actually enhances ductility, an unexpected effect since flame retardant additives, or generally all commonly used additives in PC except those that are specifically designed as impact modifiers, usually have the opposite effect, that is they are deleterious to impact strength.

TABLE 3

| | | PC homopolymer based | | PC-siloxane-1 based, 3.5 wt % siloxane* | | PC-siloxane-3 based, 3.5 wt % siloxane* | |
|---|---|---|---|---|---|---|---|
| | | lot # | | | | | |
| | | 1 | 2 | 6 | 7 | 11 | 12 |
| PC-siloxane-1 | | | | 58 | 58 | | |
| PC-siloxane-3 | | | | | | 17.50 | 17.50 |
| PC-1 | | 65.00 | 65.00 | 28.00 | 28.00 | 37.50 | 37.50 |
| PC-2 | | 35.00 | 35.00 | 14.00 | 14.00 | 45.00 | 45.00 |
| MR-01 | | | 3.00 | | 3.00 | | 3.00 |
| KSS | | | | | | | |
| KPFS | | | | | | | |
| NaTS | | | | | | | |
| TSAN | | 0.40 | 0.40 | 0.40 | 0.40 | 0.40 | 0.40 |
| MVR | | | | | | | |
| Dwell | sec | 360 | 360 | 360 | 360 | 360 | 360 |
| MVR | cm³/10 min | 10.2 | 7.65 | 9.25 | 8.48 | 9.04 | 7.86 |
| Dwell | sec | 1080 | 1080 | 1080 | 1080 | 1080 | 1080 |
| MVR | cm³/10 min | 11 | 8.54 | 9.78 | 9.25 | 9.94 | 9.24 |
| IZOD | | | | | | | |
| Temperature | ° C. | 23 | 23 | 23 | 23 | 23 | 23 |
| Ductility | % | 100 | 100 | 100 | 100 | 100 | 100 |
| Impact Strength | J/M | 845 | 741 | 854 | 716 | 793 | 690 |
| Temperature | ° C. | 0 | 0 | 0 | 0 | 0 | 0 |
| Ductility | % | 100 | 100 | 100 | 100 | 100 | 100 |

TABLE 3-continued

|  |  | PC homopolymer based | | PC-siloxane-1 based, 3.5 wt % siloxane* | | PC-siloxane-3 based, 3.5 wt % siloxane* | |
|---|---|---|---|---|---|---|---|
|  |  | \multicolumn{6}{c}{lot #} | | | | | |
|  |  | 1 | 2 | 6 | 7 | 11 | 12 |
| Impact Strength | J/M | 815 | 700 | 806 | 667 | 769 | 656 |
| Temperature | ° C. | −10 | −10 | −10 | −10 | −10 | −10 |
| Ductility | % | 80 | 100 | 100 | 100 | 100 | 100 |
| Impact Strength | J/M | 673 | 642 | 778 | 624 | 741 | 609 |
| Temperature | ° C. | −20 | −20 | −20 | −20 | −20 | −20 |
| Ductility | % | 0 | 60 | 100 | 100 | 100 | 100 |
| Impact Strength | J/M | 112 | 453 | 708 | 684 | 683 | 610 |
| Temperature | ° C. | −30 | −30 | −30 | −30 | −30 | −30 |
| Ductility | % | 0 | 0 | 80 | 100 | 100 | 100 |
| Impact Strength | J/M | 146 | 459 | 712 | 581 | 695 | 566 |
| Temperature | ° C. | −40 | −39 | −40 | −40 | −40 | −40 |
| Ductility | % | 0 | 33.3 | 60 | 100 | 100 | 100 |
| Impact Strength | J/M | 140 | 411 | 650 | 568 | 719 | 558 |
| TENSILE |  |  |  |  |  |  |  |
| Speed | mm/min | 50 | 50 | 50 | 50 | 50 | 50 |
| Temperature | ° C. | 23 | 23 | 23 | 23 | 23 | 23 |
| Modulus of Elasticity | MPa | 2224 | 2094 | 2124 | 2026 | 2062 | 1934 |
| Tensile Strength at Yield | MPa | 60 | 55.7 | 57.7 | 53.6 | 55.9 | 51.9 |
| Tensile Strength at Break | MPa | 66.7 | 47.6 | 56.1 | 55.9 | 57.5 | 58.4 |
| % Elongation at Yield | % | 6.56 | 6.3 | 6.1 | 5.82 | 6.1 | 5.88 |
| % Elongation at Break | % | 130.76 | 87.38 | 117.44 | 119.48 | 119.12 | 131.8 |
| Nominal Strain at Break | % | 100.46 | 48.68 | 83.7 | 88.5 | 85.6 | 94.5 |
| FLEXURAL |  |  |  |  |  |  |  |
| Thickness | mm | 3.1194 | 3.2112 | 3.1206 | 3.185 | 3.1978 | 3.1328 |
| Speed | mm/min | 1.27 | 1.27 | 1.27 | 1.27 | 1.27 | 1.27 |
| Flexural Modulus | MPa | 2390 | 2280 | 2240 | 2200 | 2260 | 2130 |
| Flex Stress @ 5% Strain | MPa | 88.5 | 83.6 | 85.9 | 81.3 | 84.1 | 79.3 |
| Flexural Stress @ Yield | MPa | 97.1 | 90.6 | 93 | 86.7 | 90.8 | 84.6 |

*Siloxane wt % is based on total weight of the polycarbonate components

Table 4 shows additional experiments at higher PC-siloxane content were conducted on the better performing types of compositions of Table 2. UL 94 results for the simple combinations of PC-siloxane and MR-01 (lots 1 and 2, and 6 and 7) again show the benefit of MR-01 in these type formulations. Again the benefit of added flame retardant salt is evident in specific combinations of salt type, type, and part thickness. The benefit is most evident here in comparisons of lot 7 to lots 8 and 9 at 1.2 mm and lot 7 to lot 8 at 1.0 mm. Overall, the combination of PC-siloxane-3+MR-01+KSS salt (lot 8) performed best in this testing.

TABLE 4

|  |  | PC-siloxane-1 based, 5 wt % siloxane* | | | | | PC-siloxane-3 based, 5 wt % siloxane* | | | | |
|---|---|---|---|---|---|---|---|---|---|---|---|
|  |  | \multicolumn{10}{c}{lot #} | | | | | | | | | |
|  |  | 1 | 2 | 3 | 4 | 5 | 6 | 7 | 8 | 9 | 10 |
| PC-siloxane-1 |  | 83 | 83 | 83 | 83 | 83 |  |  |  |  |  |
| PC-siloxane-3 |  |  |  |  |  |  | 25.00 | 25.00 | 25.00 | 25.00 | 25.00 |
| PC-2 |  | 17.00 | 17.00 | 17.00 | 17.00 | 17.00 | 75.00 | 75.00 | 75.00 | 75.00 | 75.00 |
| MR-01 |  |  | 3.00 | 3.00 | 3.00 | 3.00 |  | 3.00 | 3.00 | 3.00 | 3.00 |
| KSS |  |  |  | 0.30 |  |  |  |  | 0.30 |  |  |
| KPFS |  |  |  |  | 0.080 |  |  |  |  | 0.080 |  |
| NaTS |  |  |  |  |  | 0.100 |  |  |  |  | 0.100 |
| TSAN |  | 0.40 | 0.40 | 0.40 | 0.40 | 0.40 | 0.40 | 0.40 | 0.40 | 0.40 | 0.40 |
| MVR |  |  |  |  |  |  |  |  |  |  |  |
| Dwell | sec | 360 | 360 | 360 | 360 | 360 | 360 | 360 | 360 | 360 | 360 |
| MVR | cm³/10 min | 10.6 | 9.84 | 9.56 | 10.1 | 9.57 | 15.7 | 10.9 | 11.9 | 13.6 | 11.9 |
| Dwell | sec | 1080 | 1080 | 1080 | 1080 | 1080 | 1080 | 1080 | 1080 | 1080 | 1080 |
| MVR | cm³/10 min | 11.9 | 10.8 | 10.5 | 11 | 10.3 | 18 | 12.3 | 13.2 | 15.2 | 13.2 |
| UL 94 V0 |  |  |  |  |  |  |  |  |  |  |  |
|  | p(FTP) 1.2 mm | 0.178 | 0.996 | 0.911 | 0.914 | 0.850 | 0.552 | 0.938 | 0.951 | 0.99 | 0.5413 |

TABLE 4-continued

| | PC-siloxane-1 based, 5 wt % siloxane* | | | | | PC-siloxane-3 based, 5 wt % siloxane* | | | | |
|---|---|---|---|---|---|---|---|---|---|---|
| | lot # | | | | | | | | | |
| | 1 | 2 | 3 | 4 | 5 | 6 | 7 | 8 | 9 | 10 |
| p(FTP) 1.0 mm | 0.0001 | 0.834 | 0.4015 | 0.132 | 0.384 | 0.065 | 0.725 | 0.933 | 0.094 | 0.020 |

*Siloxane wt % is based on total weight of the polycarbonate components

Table 5 shows data on higher melt flow compositions. At a melt volume flow rate of ~16 cm$^3$/10 min, the compositions of PC-siloxane-1+MR-01 and PC-siloxane-3+MR-01+KSS are still best.

TABLE 5

| | PC-siloxane-1 based, 5% siloxane* | | | | PC-siloxane-3 based, 5 wt % siloxane* | | | | PC-siloxane-3/KSS, 5 wt % siloxane* | | | higher MR 01 | | |
|---|---|---|---|---|---|---|---|---|---|---|---|---|---|---|
| | lot # | | | | | | | | | | | | | |
| | 1 | 2 | 3 | 4 | 5 | 6 | 7 | 8 | 9 | 10 | 11 | 12 | 13 | 14 |
| PC-siloxane-1 | 83 | 83 | 83 | 40 | | | | | | | | 83 | | |
| PC-siloxane-2 | | | | 43.00 | | | | | | | | | | |
| PC-siloxane-3 | | | | | 25.00 | 25.00 | 25.00 | 25.00 | 25.00 | 25.00 | 25.00 | | 25.00 | 25.00 |
| PC-2 | 17.00 | 17.00 | | 17.00 | 75.00 | 75.00 | 50.00 | 30.00 | 75.00 | 50.00 | 30.00 | | 50.00 | 50.00 |
| PC-3 | | | 17.00 | | | | 25.00 | 45.00 | | 25.00 | 45.00 | 17.00 | 25.00 | 25.00 |
| MR-01 | | 3.00 | 3.00 | 3.00 | | 3.00 | 3.00 | 3.00 | 3.00 | 3.00 | 3.00 | 4.00 | 4.00 | 4.00 |
| KSS | | | | | | | | | 0.30 | 0.30 | 0.30 | | | 0.30 |
| TSAN | 0.40 | 0.40 | 0.40 | 0.40 | 0.40 | 0.40 | 0.40 | 0.40 | 0.40 | 0.40 | 0.40 | 0.40 | 0.40 | 0.40 |
| MVR | | | | | | | | | | | | | | |
| Dwell (sec) | 360 | 360 | 360 | 360 | 360 | 360 | 360 | 360 | 360 | 360 | 360 | 360 | 360 | 360 |
| MVR (cm$^3$/10 min) | 12.2 | 11.3 | 12.5 | 16.1 | 13.4 | 12.4 | 14.5 | 16.7 | 12.7 | 16.6 | 18.9 | 13 | 14.8 | 14.1 |
| Dwell (sec) | 1080 | 1080 | 1080 | 1080 | 1080 | 1080 | 1080 | 1080 | 1080 | 1080 | 1080 | 1080 | 1080 | 1080 |
| MVR (cm$^3$/10 min) | 12.5 | 12.7 | 14 | 17.9 | 15.1 | 14.1 | 17 | 19.2 | 13.7 | 17.7 | 19.5 | 14.5 | 17 | 15.1 |
| UL 94 V0 | | | | | | | | | | | | | | |
| p(FTP) 1.2 mm | 0.497 | 0.998 | 0.999 | 0.998 | 0.598 | 0.899 | 0.899 | 0.948 | — | 0.947 | 0.960 | 0.997 | 0.873 | 0.980 |
| p(FTP) 1.0 mm | 0.008 | 0.854 | 0.982 | 0.854 | 0.528 | 0.978 | 0.633 | 0.385 | 0.985 | 0.862 | 0.698 | 0.736 | 0.588 | 0.533 |
| DTUL, C | 122.2 | 120.6 | | | | 123.6 | 123.6 | | | | | | | |
| IZOD | | | | | | | | | | | | | | |
| Temp (° C.) | −30 | −30 | | | | −30 | −30 | | | | | | | |
| Ductility (%) | 100 | 100 | | | | 100 | 100 | | | | | | | |
| Impact Strength (J/M) | 669 | 552 | | | | 564 | 553 | | | | | | | |
| Temp (° C.) | −40 | −40 | | | | −40 | −40 | | | | | | | |
| Ductility (%) | 0 | 100 | | | | 40 | 20 | | | | | | | |
| Impact Strength (J/M) | 603 | 528 | | | | 549 | 523 | | | | | | | |
| Temp (° C.) | −50 | −50 | | | | −50 | −50 | | | | | | | |
| Ductility (%) | 0 | 0 | | | | 20 | 0 | | | | | | | |
| Impact Strength (J/M) | 461 | 515 | | | | 520 | 488 | | | | | | | |
| TENSILE | | | | | | | | | | | | | | |
| Modulus of Elasticity, MPa | 2102 | 1972 | | | | 1964 | 1968 | | | | | | | |
| Tensile Strength at Yield, Mpa | 57 | 52.8 | | | | 51.1 | 50.7 | | | | | | | |
| Tensile Strength at Break, Mpa | 58.6 | 55.5 | | | | 56.3 | 57.6 | | | | | | | |

TABLE 5-continued

| | PC-siloxane-1 based, 5% siloxane* | | | | PC-siloxane-3 based, 5 wt % siloxane* lot # | | | | PC-siloxane-3/KSS, 5 wt % siloxane* | | | higher MR 01 | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| % Elongation at Yield | 5.98 | 5.64 | | | | 5.7 | 5.68 | | | | | | | |
| % Elongation at Break | 128.22 | 125.66 | | | | 148.68 | 143.5 | | | | | | | |
| Nominal Strain at Break | 95 | 91.96 | | | | 93.56 | 98.64 | | | | | | | |
| FLEXURAL | | | | | | | | | | | | | | |
| Flexural Modulus, Mpa | 2220 | 2100 | | | | 2090 | 2090 | | | | | | | |
| Flex Stress @ 5% Strain, Mpa | 83.6 | 78.4 | | | | 75.4 | 74.8 | | | | | | | |
| Flexural Stress @ Yield, Mpa | 90.3 | 83.1 | | | | 80.3 | 79.5 | | | | | | | |

*Siloxane wt % is based on total weight of the polycarbonate components

Table 6 shows formulations prepared with a lower content of the silicone core shell additive, MR-01. As shown, compositions with lower MR-01 content still exhibited a high probability of first time pass of the UL 94 V0 test.

TABLE 6

| | | PC-siloxane-1 based, 5 wt % siloxane* | | | PC-siloxane-3 based, 5 wt % siloxane* Lot # | | | PC-siloxane-3 based, 5 wt % siloxane*, 0.3 phr KSS | | |
|---|---|---|---|---|---|---|---|---|---|---|
| | | 1 | 2 | 3 | 4 | 5 | 6 | 7 | 8 | 9 |
| PC-siloxane -1 | | 40 | 40 | 40 | | | | | | |
| PC-siloxane -2 | | 43.00 | 43.00 | 43.00 | | | | | | |
| PC-siloxane -3 | | | | | 25.00 | 25.00 | 25.00 | 25.00 | 25.00 | 25.00 |
| PC-2 | | 17.00 | 17.00 | 17.00 | 50.00 | 50.00 | 50.00 | 50.00 | 50.00 | 50.00 |
| PC-3 | | | | | 25.00 | 25.00 | 25.00 | 25.00 | 25.00 | 25.00 |
| MR-01 | | 3.00 | 2.50 | 2.00 | 3.00 | 2.50 | 2.00 | 3.00 | 2.50 | 2.00 |
| KSS | | | | | | | | 0.30 | 0.30 | 0.30 |
| TSAN | | 0.40 | 0.40 | 0.40 | 0.40 | 0.40 | 0.40 | 0.40 | 0.40 | 0.40 |
| MVR | | | | | | | | | | |
| Dwell | sec | 360 | 360 | 360 | 360 | 360 | 360 | 360 | 360 | 360 |
| MVR | cm³/10 min | 13.6 | 15.1 | 15.3 | 13.2 | 12.7 | 14.3 | 14.3 | 14.9 | 14.7 |
| Dwell | sec | 1080 | 1080 | 1080 | 1080 | 1080 | 1080 | 1080 | 1080 | 1080 |
| MVR | cm³/10 min | 15.7 | 15.8 | 16.7 | 13.4 | 14.6 | 15.2 | 15.4 | 15.1 | 16.3 |
| UL 94 V0 | p(FTP) 1.2 mm | 0.998 | 0.999 | 0.998 | 0.992 | 0.977 | 0.997 | 0.975 | 0.987 | 0.998 |
| | p(FTP) 1.0 mm | 0.996 | 0.994 | 0.981 | 0.905 | 0.897 | 0.914 | — | 0.178 | 0.153 |

*Siloxane wt % is based on total weight of the polycarbonate components

Table 7 shows that blends with a melt volume flow rate of ~16 cm³/10 min and 5% siloxane content did exhibit flame retardance performance as good as PC-siloxane-1+MR-01 (MVR=16 cm³/10 min, 5% siloxane) or PC-siloxane-3+KSS+MR-01 (MVR=16 cm³/10 min, 5% siloxane) from Table 5.

TABLE 7

| | | 5 wt % siloxane* | | | |
|---|---|---|---|---|---|
| Lot # | | 1 | 2 | 3 | 4 |
| PC-siloxane-1 | | | 16.7 | 33.4 | 50 |
| PC-siloxane-3 | | 25.00 | 20.00 | 15.00 | 10.00 |
| PC-2 | | 50.00 | | | |
| PC-3 | | 25.00 | 63.30 | 51.60 | 40.00 |
| MR-01 | | 3.00 | 3.00 | 3.00 | 3.00 |
| TSAN | | 0.400 | 0.400 | 0.400 | 0.400 |
| MVR | 360 sec dwell | 12.4 | 18.2 | 17.5 | 15.6 |
| | 1080 sec dwell | 13.6 | 19.8 | 19.3 | 17.1 |
| UL 94 V0 | p(FTP) 1.2 mm | 0.999 | 0.899 | 0.996 | 0.990 |
| | p(FTP) 1.0 mm | 0.738 | 0.660 | 0.241 | 0.259 |

*Siloxane wt % is based on total weight of the polycarbonate components

The effect of colorants on composition flame retardance performance was evaluated. The effect of colorants on flame retardance is important for commercial purposes and for UL listing of new grades. Table 8 shows that PC-siloxane-3+KSS based compositions performed best when titanium dioxide was present in the blend.

TABLE 8

| | | PC-siloxane-1/PC-siloxane-2 based, 5 wt % siloxane* | | | | PC-siloxane-3 based, 5 wt % siloxane* lot # | | | | PC-siloxane-3/KSS, 5 wt % siloxane* | | | |
|---|---|---|---|---|---|---|---|---|---|---|---|---|---|
| | | 1 | 2 | 3 | 4 | 5 | 6 | 7 | 8 | 9 | 10 | 11 | 12 |
| PC-siloxane-1 | | 40 | 40 | 40 | 40 | | | | | | | | |
| PC-siloxane-2 | | 43.00 | 43.00 | 43.00 | 43.00 | | | | | | | | |
| PC-siloxane-3 | | | | | | 25.00 | 25.00 | 25.00 | 25.00 | 25.00 | 25.00 | 25.00 | 25.00 |
| PC-2 | | 17.00 | 17.00 | 17.00 | 17.00 | 50.00 | 50.00 | 50.00 | 50.00 | 50.00 | 50.00 | 50.00 | 50.00 |
| PC-3 | | | | | | 25.00 | 25.00 | 25.00 | 25.00 | 25.00 | 25.00 | 25.00 | 25.00 |
| MR-01 | | 2.00 | 3.00 | 2.00 | 3.00 | 2.00 | 3.00 | 2.00 | 3.00 | 2.00 | 3.00 | 2.00 | 3.00 |
| KSS | | | | | | | | | | 0.30 | 0.30 | 0.30 | 0.30 |
| TSAN | | 0.40 | 0.40 | 0.40 | 0.40 | 0.40 | 0.40 | 0.40 | 0.40 | 0.40 | 0.40 | 0.40 | 0.40 |
| TiO$_2$ | | 2.00 | 2.00 | 3.00 | 3.00 | 2.00 | 2.00 | 3.00 | 3.00 | 2.00 | 2.00 | 3.00 | 3.00 |
| MVR | | | | | | | | | | | | | |
| Dwell | sec | 360 | 360 | 360 | 360 | 360 | 360 | 360 | 360 | 360 | 360 | 360 | 360 |
| MVR | cm$^3$/10 min | 15.9 | 15.5 | 14.8 | 15.1 | 14.2 | 14 | 14.4 | 13.9 | 14.4 | 14.5 | 14.3 | 14.2 |
| Dwell | sec | 1080 | 1080 | 1080 | 1080 | 1080 | 1080 | 1080 | 1080 | 1080 | 1080 | 1080 | 1080 |
| MVR | cm$^3$/10 min | 17.5 | 17 | 17.3 | 16.6 | 16.6 | 16.3 | 16.7 | 16 | 16.4 | 16.8 | 16.5 | 16.2 |
| UL 94 V0 | | | | | | | | | | | | | |
| | p(FTP) 1.2 mm | 0.086 | 0.010 | 0.019 | 0.028 | 0.811 | 0.627 | 0.010 | 0.002 | 0.879 | 0.878 | 0.959 | 0.869 |
| | p(FTP) 1.0 mm | | | | | 0.000 | 0.004 | fail | fail | 0.847 | 0.425 | 0.638 | 0.205 |

*Siloxane wt % is based on total weight of the polycarbonate components

It is understood that the foregoing detailed description and accompanying examples are merely illustrative and are not to be taken as limitations upon the scope of the invention, which is defined solely by the appended claims and their equivalents.

Various changes and modifications to the disclosed embodiments will be apparent to those skilled in the art. Such changes and modifications, including without limitation those relating to the chemical structures, substituents, derivatives, intermediates, syntheses, compositions, formulations, or methods of use of the invention, may be made without departing from the spirit and scope thereof.

What is claimed is:

1. A composition comprising:
   a polycarbonate-siloxane copolymer having a weight average molecular weight of 28,000 Daltons to 32,000 Daltons and a siloxane content of 18 wt % to 22 wt %, the polycarbonate-siloxane copolymer present in the composition in an amount of about 25 wt %, based on the polycarbonate content of the composition;
   one or more bisphenol-A polycarbonates having a weight average molecular weight of 17,000 Daltons to 31,000 Daltons, the one or more bisphenol-A polycarbonates present in the composition in an amount of about 75 wt %, based on the polycarbonate content of the composition;
   a silicone-based graft copolymer comprising (a) 60% to 80% by weight of a silicone core component, and (b) a graft polymer shell derived from at least methacrylic ester monomer, the silicone-based graft copolymer present in the composition in an amount of about 2 wt % to about 4 wt %, based on the polycarbonate content of the composition;
   styrene-acrylonitrile copolymer encapsulated polytetrafluoroethylene (TSAN), present in the composition in an amount of about 0.3 wt % to about 0.5 wt %, based on the polycarbonate content of the composition;
   potassium diphenyl sulfone-3-sulfonate (KSS), present in the composition in an amount of about 0.25 wt % to about 0.35 wt %, based on the polycarbonate content of the composition; and
   titanium dioxide, present in the composition in an amount of about 0.8 wt % to about 3.0 wt %, based on the polycarbonate content of the composition;
   wherein a flame bar comprising the composition achieves a UL94 V0 rating at a thickness of 1.2 mm or 1.0 mm;
   wherein the composition has a notched Izod impact strength (NII) of greater than or equal to 500 J/m, measured at −40° C. according to ASTM D 256; and
   wherein the composition does not include aliphatic polyester-polycarbonate copolymers.

2. An article comprising the composition of claim 1, the article selected from: components and housings for cell phones and other portable electronic devices, housings for medical devices, telecommunication enclosures, housings for outdoor electronics devices, solar collector components, and housings for scanners.

* * * * *